(12) United States Patent
Yokomitsu et al.

(10) Patent No.: US 11,146,722 B2
(45) Date of Patent: *Oct. 12, 2021

(54) WEARABLE CAMERA, IN-VEHICLE COMMUNICATION DEVICE, CHARGING DEVICE, AND COMMUNICATION SYSTEM

(71) Applicant: Panasonic i-PRO Sensing Solutions Co., Ltd., Fukuoka (JP)

(72) Inventors: Yasushi Yokomitsu, Fukuoka (JP); Ryoko Tanabiki, Fukuoka (JP); Hiroaki Ohnishi, Fukuoka (JP); Shoji Hatta, Kanagawa (JP)

(73) Assignee: Panasonic i-PRO Sensing Solutions Co., Ltd., Fukuoka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/701,925

(22) Filed: Dec. 3, 2019

(65) Prior Publication Data

US 2020/0106947 A1    Apr. 2, 2020

Related U.S. Application Data

(63) Continuation of application No. 15/590,886, filed on May 9, 2017, now Pat. No. 10,530,983.

(30) Foreign Application Priority Data

Dec. 20, 2016   (JP) ................................ 2016-246918

(51) Int. Cl.
*H04N 5/232* (2006.01)
*H04N 5/77* (2006.01)
(Continued)

(52) U.S. Cl.
CPC ..... *H04N 5/232061* (2018.08); *B60R 25/305* (2013.01); *H04N 5/232* (2013.01);
(Continued)

(58) Field of Classification Search
CPC .. H04N 5/23203; H04N 5/23209; H04N 5/77; H04N 5/23206; H04W 76/38
See application file for complete search history.

(56) References Cited

U.S. PATENT DOCUMENTS 9,407,624 B1    8/2016 Myers et al.
2007/0230910 A1*  10/2007 Welch .................... G08C 17/02
                                                              386/230
(Continued)

FOREIGN PATENT DOCUMENTS

JP         2016-085581 A       5/2016

*Primary Examiner* — Paul M Berardesca
(74) *Attorney, Agent, or Firm* — Seed IP Law Group LLP

(57) ABSTRACT

A wearable camera images a subject in front of the user, executes a first communication setting process for communicating with an in-vehicle communication device, mounted in a vehicle on which the user rides, stores first communication setting information used for communication with the in-vehicle communication device, based on the first communication setting process, in a memory, and transmits a captured image of the subject to the in-vehicle communication device, using the first communication setting information. The wearable camera deletes the first communication setting information from the memory, after a lapse of a certain time from a last communication time.

8 Claims, 18 Drawing Sheets

(51) Int. Cl.
*H04W 76/38* (2018.01)
*B60R 25/30* (2013.01)
*H04N 7/18* (2006.01)

(52) U.S. Cl.
CPC ............... *H04N 5/77* (2013.01); *H04N 7/185* (2013.01); *H04W 76/38* (2018.02)

(56) References Cited

U.S. PATENT DOCUMENTS

| | | |
|---|---|---|
| 2009/0253374 A1 | 10/2009 | Matsuo et al. |
| 2010/0128632 A1 | 5/2010 | Mantysalo |
| 2012/0030465 A1 | 2/2012 | Bailey |
| 2014/0118145 A1* | 5/2014 | Wawrzyniak ...... G08B 21/0247 340/568.8 |
| 2016/0119663 A1 | 4/2016 | Yamaguchi et al. |
| 2018/0020147 A1* | 1/2018 | Page .................... H04N 7/185 |

* cited by examiner

FIG. 7A

| No | CTB INFORMATION | |
|---|---|---|
| 1 | MAC address(1) | ENCRYPTION KEY (1) |
| 2 | MAC address(2) | ENCRYPTION KEY (2) |

FIG. 7B

| No | BWC INFORMATION | |
|---|---|---|
| 1 | MAC address(1) | ENCRYPTION KEY (1) |
| 2 | MAC address(2) | ENCRYPTION KEY (2) |
| 3 | MAC address(3) | ENCRYPTION KEY (3) |
| 4 | MAC address(4) | ENCRYPTION KEY (4) |
| 5 | MAC address(5) | ENCRYPTION KEY (5) |
| 6 | MAC address(6) | ENCRYPTION KEY (6) |
| 7 | 000000000000 (NO REGISTRATION) | 00000000 (NO REGISTRATION) |
| 8 | 000000000000 (NO REGISTRATION) | 00000000 (NO REGISTRATION) |
| 9 | 000000000000 (NO REGISTRATION) | 00000000 (NO REGISTRATION) |
| 10 | 000000000000 (NO REGISTRATION) | 00000000 (NO REGISTRATION) |

FIG. 7C

| No | CTB INFORMATION | |
|---|---|---|
| 1 | SSID(1) | ENCRYPTION KEY (1) |
| 2 | SSID(2) | ENCRYPTION KEY (2) |

FIG. 7D

| CTB SPECIFIC INFORMATION (SET VALUE) | |
|---|---|
| SSID | SSID |
| Network KEY (ENCRYPTION KEY) | ENCRYPTION KEY |

*FIG. 7E*

| No | BWC INFORMATION | |
|----|---|---|
| 1 | MAC address(1) | |
| 2 | MAC address(2) | |
| 3 | MAC address(3) | |
| 4 | MAC address(4) | |
| 5 | MAC address(5) | |
| 6 | MAC address(6) | |
| 7 | 000000000000 (NO REGISTRATION) | |
| 8 | 000000000000 (NO REGISTRATION) | |
| 9 | 000000000000 (NO REGISTRATION) | |
| 10 | 000000000000 (NO REGISTRATION) | |

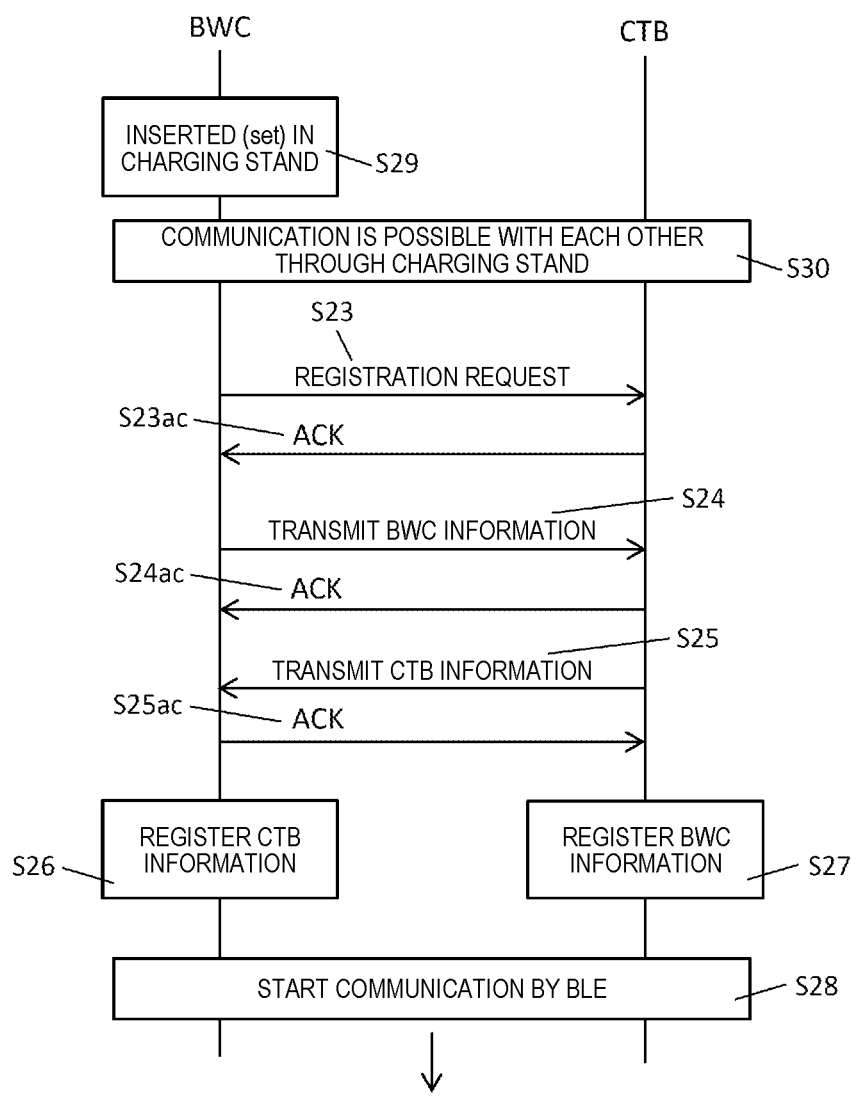

FIG. 16

| Power input (1) | Power input (2) (PC connected) | Power supply to BWC | Switch | LED1 (PWR) | LED2 (PC) |
|---|---|---|---|---|---|
| YES | YES | (1) | LAN | ON | OFF |
| | | | PC | | ON |
| | NO (No PC connected) | | LAN | | OFF |
| | | | PC | | OFF |
| NO | YES | (2) | LAN | OFF | OFF |
| | | | PC | | ON |
| | NO (No PC connected) | -- | ANY | | OFF |

WEARABLE CAMERA, IN-VEHICLE COMMUNICATION DEVICE, CHARGING DEVICE, AND COMMUNICATION SYSTEM

BACKGROUND

1. Technical Field

The present disclosure relates to a wearable camera worn or possessed by a user, an in-vehicle communication device placed on a vehicle on which the user rides and communicating with the wearable camera, a charging device that charges the wearable camera, a communication system including the wearable camera, the in-vehicle communication device, or the charging device.

2. Description of the Related Art

In recent years, for example, an operation causing a police officer to wear or possess a wearable camera during steady patrolling or in an emergency situation (for example, when rushing to a field of incident) has been promoted, in order to efficiently support the works of police officers and security guards. Hereinafter, in order to make a description easier to understand, the work of a police officer is exemplified, but the operation may be applied to the work of a user such as a security guard rather than a police officer.

The police officer rides on a police vehicle (for example, a patrol car (a so-called police car)) during patrolling or in an emergency situation. Each police vehicle usually has an in-vehicle camera system including one or more in-vehicle cameras, and an in-vehicle communication device that links wireless communication between the in-vehicle camera system and the wearable camera. The in-vehicle camera system includes, for example, an in-vehicle camera and an in-vehicle recorder, and records in the in-vehicle recorder, image data (for example, an image during patrolling or a situation image of a field of incident) captured by the in-vehicle camera. Further, if the communication between the wearable camera and the in-vehicle camera system can be linked by the in-vehicle communication device, since the image capturing by the wearable camera and the image capturing by the in-vehicle recorder can automatically be performed in synchronization with each other and images of a field of incident can be recorded diversely, for example, the evidence is enhanced and the work efficiency of a police officer is enhanced for collecting evidence and the like for trials.

Here, as a technique in the related art in which a wearable camera and an in-vehicle camera system are linked using an in-vehicle personal computer (PC) used in a police vehicle, for example, in Japanese Patent Unexamined Publication No. 2016-85581, if a user's login to operate an in-vehicle camera system is authenticated, a PC saves login information including identification information of the user, and in a case where the user is logging in the in-vehicle camera system, the PC transfers the saved login information to the wearable camera so as to copy it. Thus, the relationship among the image captured by the wearable camera, the image captured by the in-vehicle camera system, and the user who captures the images is clearly associated.

For example, a police department has two operations with respect to police vehicles on which police officers ride: an operation in which the police vehicles are fixed on a daily basis, and an operation in which police vehicles are changed every day. It is speculated that which operation is to be promoted depends on the policy and scale of a police department. For example, in a case where the operation is promoted in which police vehicles on which police officers ride are changed every day, the police officer needs to set up wireless communication between the wearable camera and the above-mentioned in-vehicle communication device each time the police vehicle is changed.

However, in the above-mentioned prior art, a technique is not provided that easily checks the presence or absence of wireless communication setting between the wearable camera used by a police officer and the in-vehicle communication device in a police vehicle on which the police officer is supposed to ride, in the wearable camera or the in-vehicle communication device, when the police officer rides on another police vehicle different from the police vehicle that the police officer used the day before. Further, many police vehicles are parked in the parking lot in the police department. When the police officer arrives at the parking lot, there is a possibility that wireless communication connection is established between the wearable camera and the in-vehicle communication device in the police vehicle that the police officer used the day before. In this case, wireless communication between the wearable camera used by the police officer and the in-vehicle communication device in the police vehicle on which the police officer rides is not linked, and for example, there is a problem that the work of the police officer is hindered such as that image capturing by the wearable camera and image capturing by the in-vehicle recorder cannot automatically be started in cooperation with each other.

SUMMARY

The present disclosure has been made in view of the above-mentioned conventional circumstances, an object thereof is to provide a wearable camera and a communication system, which support periodic execution of set up of wireless communication with an in-vehicle communication device mounted on each vehicle on which a user rides, and is able to set up wireless communication with an in-vehicle communication device in a vehicle on which the user is supposed to ride, even in a case of changing the vehicle on which the user rides, and efficiently support work of the user.

The present disclosure provides a wearable camera capable of being worn or possessed by a user, including an capture that images a subject in front of the user, a first communication setter that executes a first communication setting process for communicating with an in-vehicle communication device installed in a vehicle on which the user rides, a memory that stores first communication setting information used for communication with the in-vehicle communication device, based on the first communication setting process; a first communicator that transmits a captured image of the subject to the in-vehicle communication device, using the first communication setting information stored in the memory, and a first controller that deletes the first communication setting information from the memory, after a lapse of a certain time from a last communication time in the first communicator.

According to the present disclosure, it is possible to support periodic execution of set up of wireless communication with an in-vehicle communication device mounted on each vehicle on which a user rides, and is able to set up wireless communication with an in-vehicle communication device in a vehicle on which the user is supposed to ride, even in a case of changing the vehicle on which the user rides, and efficiently support work of the user.

BRIEF DESCRIPTION OF THE DRAWINGS

FIG. 7A is a diagram illustrating an example of pairing information registered in a case where the wearable camera in each exemplary embodiment performs BLE communication;

FIG. 7B is a diagram illustrating an example of pairing information registered in a case where the common trigger box in each exemplary embodiment performs BLE communication;

FIG. 7C is a diagram illustrating an example of communication setting information registered in a case where the wearable camera in each exemplary embodiment performs WLAN communication;

FIG. 7D is a diagram illustrating an example of communication setting information registered in a case where the common trigger box in each exemplary embodiment performs WLAN communication;

FIG. 7E is a diagram illustrating an example of communication setting information registered in a case where the common trigger box in each exemplary embodiment performs WLAN communication;

FIG. 11B is a sequence diagram illustrating in detail a second example of an operation procedure regarding pairing between the wearable camera and the common trigger box in Exemplary embodiment 2;

FIG. 16 is a table illustrating an example of an operation procedure of the charging stand illustrated in FIG. 15.

DETAILED DESCRIPTION

Hereinafter, exemplary embodiments that specifically disclose a wearable camera, an in-vehicle communication device, a charging device, and a communication system according to the present disclosure will be described in detail with reference to the accompanying drawings as appropriate. However, detailed description more than necessary may be omitted in some cases. For example, detailed descriptions of already well-known matters and duplicate descriptions for substantially the same components may be omitted in some cases. This is to facilitate the understanding of those skilled in the art, by avoiding the following description from being unnecessarily redundant. In addition, the accompanying drawings and the following description are provided in order to help those skilled in the art fully understand the present disclosure, and are not intended to limit the subject described in claims.

Exemplary Embodiment 1

Figure 1:
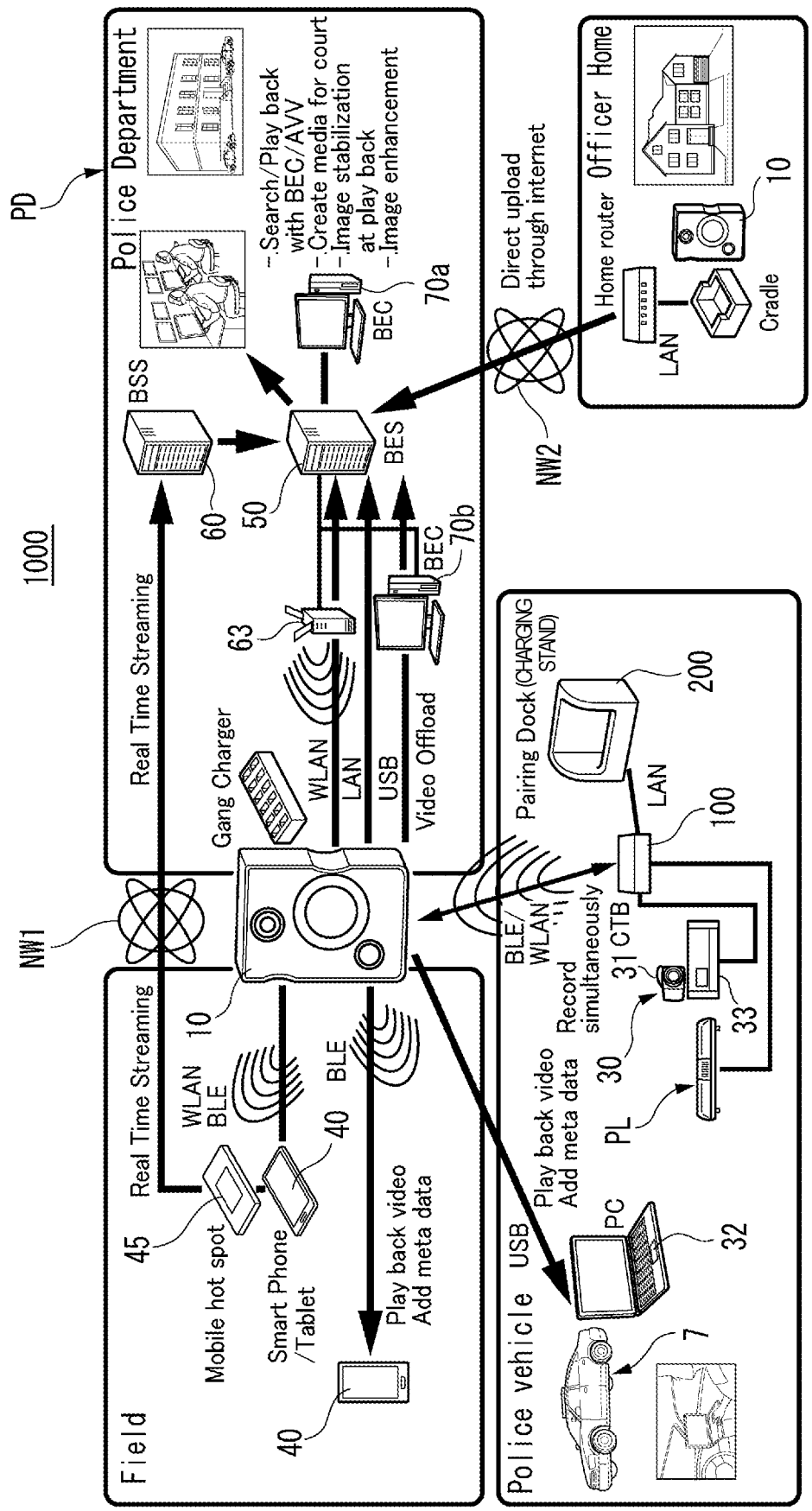
FIG. 1 is an outline explanatory diagram showing an example of a system configuration of a communication system according to each exemplary embodiment.

FIG. 1 is an outline explanatory diagram showing an example of a system configuration of communication system 1000 according to each exemplary embodiment. The communication system 1000 shown in FIG. 1 includes a wearable camera 10 that can be worn or possessed by a police officer, various devices disposed in police department PD, various devices used by the police officer in a field, and various devices used or mounted inside police vehicle 7 (for example, a patrol car (a so-called police car)). The same is applied herein), and various devices used in an officer home of a police officer. Wearable camera 10 may belong to any one of various devices disposed in police department PD, various devices used by a police officer in a field, various devices used or mounted inside the police vehicle, and various devices used in an officer home of a police officer.

Examples of the various devices disposed in a police department (PD) include at least back end server 50 (BES), back end streaming server 60 (BSS), back end clients (BEC) 70a and 70b, wireless local area network (LAN) access point 63, and a gang charger as an example of a charging device that can collectively charge a plurality of wearable cameras, but are not limited thereto.

Examples of various devices used by a police officer in a field include at least smartphone 40 possessed by a police officer (a tablet terminal is possible), and a wireless LAN access point 45 possessed by a police officer, but are not limited thereto. Smartphone 40 and wireless LAN access point 45 are possessed, for example, within a pocket of a uniform worn by a police officer.

Examples of various devices used or mounted inside police vehicle 7 include at least in-vehicle camera system (ICV: in-car video) 30, in-vehicle PC 32, common trigger box 100 (CTB) as an example of an in-vehicle communication device, charging stand 200 as an example of a charging device (Pairing Dock), and rotation warning light PL, but are not limited thereto.

Examples of the various devices used in an officer home of a police officer include at least a cradle for charging wearable camera 10, and a home router, but are not limited thereto.

In-vehicle camera system 30 includes one or a plurality of in-vehicle cameras 31, in-vehicle PC 32, and in-vehicle recorder 33, and captures an incident encountered while traveling by police vehicle 7 or a situation during patrolling as images, and records the images. One or a plurality of in-vehicle cameras 31 includes one or a plurality of cameras, for example, among a camera installed so as to capture an image the front of police vehicle 7, and respective cameras installed so as to respectively capture images of the left side, the right side, and the rear side of police vehicle 7. In-vehicle PC 32 as an example of an editing device controls the operations of in-vehicle camera 31 and in-vehicle recorder 33, according to the operation of police officer 3. In-vehicle recorder 33 records data of respective images captured by the plurality of in-vehicle cameras 31 in chronological order. In a case of being connected to wearable camera 10 by a universal serial bus (USB), in-vehicle PC 32 can charges wearable camera 10, and acquire data of an image captured by wearable camera 10 through the USB so as to play back the acquired image in a default application installed in in-vehicle PC 32, or add attribute information of the image in the application in response to the operation of the police officer.

In-vehicle camera system 30 is connected to common trigger box 100 in a wired manner (for example, LAN communication), and performs an operation in response to a command from common trigger box 100 (for example, stop or start of data recording of an image captured by in-vehicle camera 31 (that is, recording)). In-vehicle camera system 30 is communicably connected to wearable camera 10 through common trigger box 100, and starts recording in in-vehicle recorder 33 at the same time as a timing at which wearable camera 10 starts capturing. Conversely, recording may be started in wearable camera 10 at the same time as a timing at which in-vehicle recorder 33 starts capturing. Further, in-vehicle camera system 30 may record the image captured by wearable camera 10 in in-vehicle recorder 33.

Wearable camera 10 is attached or held in the uniform of a police officer who is an example of the user, images the situation in front of the police officer as a subject, and transmits the data of the image obtained by the capturing to in-vehicle camera system 30 through common trigger box 100, starts capturing at the same time by in wearable camera 10 and in-vehicle recorder 33, directly transmits the data to back end server 50 through wireless LAN access point 63, or streams the data to back end streaming server 60 through smartphone 40 or wireless LAN access point 45, and network NW1 (for example, mobile communication network or Internet network). In police department PD, wearable camera 10 may transmit data of the image obtained by capturing to back end client 70b connected by the USB, or back end server 50 connected by the LAN in police department PD. In addition, wearable camera 10 can transmit data of captured images to back end server 50 by being manually placed on the charging surface of the gang charger.

The subject to be captured by wearable camera 10 or in-vehicle camera 31 includes not only people, but also the scene of the field of incident, a crowd gathering near the field (so-called, onlookers), and the atmosphere surrounding the capturing position. Police officer 3 may possess smartphone 40 or wireless LAN access point 45, as an example of a wireless terminal capable of communicating with wearable camera 10.

Smartphone 40 has a telephone function and a wireless communication function (for example, a designing function), is used for an emergency contact from police department 4 or an emergency contact to the police department, and relays data from wearable camera 10 to back end streaming server 60 in police department PD. In addition, smartphone 40 plays back the data of the captured image by wearable camera 10, or performs editing of adding attribute information (metadata) to the data of the captured image, in response to an operation of the police officer.

Wireless LAN access point 45 relays data from wearable camera 10 to back end streaming server 60 in police department PD. Wireless communication (for example, Bluetooth (registered trademark) low energy (BLE) or wireless LAN (WLAN, for example, Wifi (registered trademark)) is used between wearable camera 10 and smartphone 40 or wireless LAN access point 45. In high-speed communication such as when wearable camera 10 streams data to back end streaming server 60 through smartphone 40 or wireless LAN access point 45, wireless communication using a wireless LAN with a higher transmission speed than BLE is used. On the other hand, when realizing low-speed communication such as editing data such as incident number of the captured image by wearable camera 10 in smartphone 40, wireless communication using BLE is used.

Back end server 50 is configured with a computer and a storage, and manages evidence images of an incident. Back end server 50 has an image analysis function such as a face recognition function for recognizing a face in an image frame constituting the image captured by, for example, wearable camera 10 or in-vehicle camera 31 and an editing function for editing at least a part of the image through image processing or the like, in response to a request according to the operation of a user (for example, an analysis specialist in police department PD) using back end clients 70a and 70b. Back end server 50 has a play back function of playing back the image captured by, for example, wearable camera 10 or in-vehicle camera 31 and an editing function for editing at least a part of the image through image processing or the like, in response to a request according to the operation of a user (for example, an analysis specialist in police department PD) using back end clients 70a and 70b.

Back end streaming server 60 receives the data of the image streamed from wearable camera 10 and transfers it to back end server 50.

Back end clients 70a and 70b are configured with, for example, a PC, and have a browser or a dedicated application capable of accessing a suspicious person database (DB, not shown) in back end server 50, searching information concerning criminal cases, and displaying the searched result on a display device (for example, liquid crystal displays (LCDs) provided in back end clients 70a and 70b). In the suspicious person DB, for example, a person who is wanted, a criminal of the past or the like is registered in advance in association with information (for example, case number) identifying the case. Back end clients 70a and 70b can access the sound DB of back end server 50, and can search for sound information on incidents such as criminals. Back end client 70 may be installed not only inside police department 4 but also outside police department 4. Further, back end client 70 may be either a thin client PC or a rich client PC.

Wireless LAN access point 63 is connected to wearable camera 10 through a wireless LAN (WLAN) in a wireless manner, and relays and transfers, for example, the data of the image transmitted from wearable camera 10 to back end server 50.

The gang charger enables wearable cameras 10 which are respectively worn or possessed by a plurality of police officers to be placed on a predetermined charging surface, and charges the batteries of respective placed wearable cameras 10. The gang charger also has a function of performing wired communication with wearable camera 10 during charging and transmitting the data of the image stored in wearable camera 10 to back end server 50. Alternatively, wearable camera 10 may directly communicate with back end server 50 by a LAN interface (not shown), through the gang charger. In addition, the gang charger is connected in a wired manner to back end client 70b through a universal serial bus (USB) cable.

Common trigger box 100 is connected to rotation warning light PL, a siren (not shown), in-vehicle camera system 30, charging stand 200 respectively in a wired manner (for example, LAN communication), and is also connectable to wearable camera 10 through charging stand 200 when wearable camera 10 is connected to charging stand 200. Common trigger box 100 transmits a control signals to start or stop recording by using BLE or wireless LAN (WLAN) between a device connected to common trigger box 100 in a wired or wireless manner (hereinafter, it may be referred to as "CTB connected device") and wearable camera 10 so as to control the start or stop of recording between wearable camera 10 and CTB connected device in synchronization with each other. Examples of CTB connected device are rotation warning light PL, siren (not shown), in-vehicle camera system 30, and charging stand 200, which are described above.

In a case of being connected to, for example, in-vehicle camera system 30 in a wired manner (for example, LAN communication), common trigger box 100 transmits a control signal to start or stop recording, to in-vehicle camera system 30. Thus, for example, in-vehicle camera system 30 starts recording or stops recording of the data of an image captured by in-vehicle camera 31 to in-vehicle recorder 33, as an operation corresponding to the control signal from common trigger box 100. When acquiring an operation start signal from a device mounted in a police vehicle such as for example, rotation warning light PL or a siren, common trigger box 100 detects the start of use of the device mounted in the police vehicle, and transmits a control signal to start or stop recording to wearable camera 10 or in-vehicle camera system 30, connected to common trigger box 100. Thus, wearable camera 10 and in-vehicle camera system 30 starts or stops recording of the data of the image obtained by capturing, for example, along with the rotation start of rotation warning light PL or the sound output of the siren, as an operation in response to the control signal from common trigger box 100.

In the case where the connected devices of common trigger box are only in-vehicle recorder 33 and wearable camera 10, if one (for example, in-vehicle recorder 33) informs common trigger box 100 that the recording is started or stopped, common trigger box 100 transmits a control signal to start or stop recording to the other (for example, wearable camera 10). Thus, common trigger box 100 can start or stop recording on both in-vehicle recorder 33 and wearable camera 10 almost at the same time.

Charging stand 200 is disposed at, for example, the default position (for example, in the vicinity of the center console) of police vehicle 7, and is connected to common trigger box 100 in a wired manner (for example, Power over Ethernet (PoE) (Registered trademark) using a LAN cable). Charging stand 200 has a charging surface for placing wearable camera 10. In a case where charging stand 200 is connected to common trigger box 100 in a wired manner (for example, Power over Ethernet (PoE) (Registered trademark) using a LAN cable) and is connected to wearable camera 10 by placing wearable camera 10 on the charging surface, it is possible to charge the battery of wearable camera 10 based on the supply current from common trigger box 100.

It is assumed that a police officer places wearable camera 10 on a cradle corresponding to wearable camera 10, for example, when returning an officer home or during vacation. In this case, wearable camera 10 can transmit the data of the image captured by wearable camera 10 to back end server 50 through the home router connected to the cradle in a wired manner (for example, LAN communication) and the network NW2.

Figure 2:
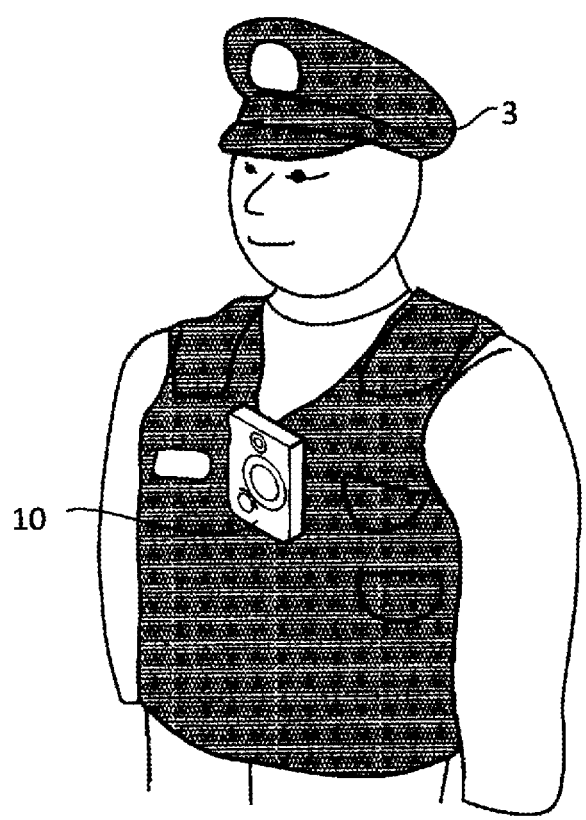
FIG. 2 is a diagram illustrating an example of the upper body of a police officer wearing a wearable camera of each exemplary embodiment.

FIG. 2 is a diagram illustrating an example of the upper body of police officer 3 wearing wearable camera 10 of each exemplary embodiment. Wearable camera 10 is attached or held at the front of the uniform of police officer 3 so as to be able to image the front of police officer 3. Wearable camera 10 may be fixed to the front of the uniform in a state of hanging from the neck with a string. Wearable camera 10 may be fixed to the front of the uniform, by a fixture (for example, attachment clip) attached to the back of casing 10z (see FIG. 3) of wearable camera 10 being engaged with a fixture attachment attached to the front of the uniform.

Figure 3:
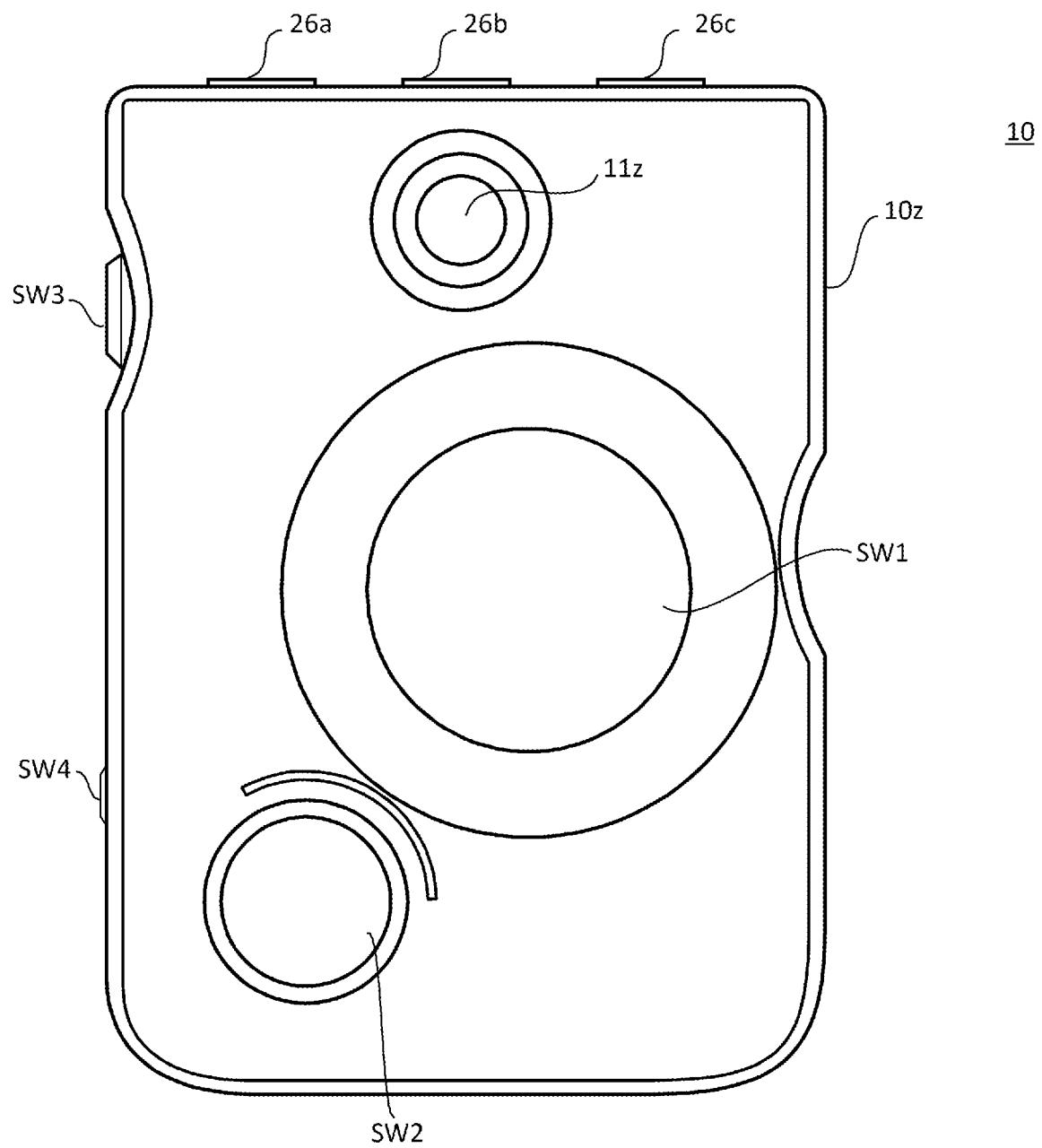
FIG. 3 is a front view illustrating an example of a front-side surface of a casing of the wearable camera of each exemplary embodiment.

FIG. 3 is a front view illustrating an example of a front-side surface of a casing 10z of wearable camera 10 of each exemplary embodiment. Recording switch SW1, snapshot switch SW2, and capturing lens 11z are disposed on the front-side surface of casing 10z. Recording switch SW1 is used to instruct the start of recording by being pressed for a short time, and instruct the stop of recording by being pressed for a long time (for example, an operation in which the pressed state for three seconds is continued). Snapshot switch SW2 is used to instruct recording of a still image captured by capture 11, for example, each time it is pressed. Capturing lens 11z forms an optical image of the subject captured by wearable camera 10 on the capturing surface of capture 11 (see FIG. 4).

Communication mode switch SW3 and attribute information adding switch SW4 are disposed on the side surface of casing 10z. For example, three LEDs 26a, 26b, and 26c are disposed on the upper surface of casing 10z. LED 26a displays the power on/off state of wearable camera 10 and the state of battery 25 (see FIG. 4). LED 26b displays the state of the capturing operation of wearable camera 10. LED 26c displays the state of the communication mode of wearable camera 10.

Figure 4:
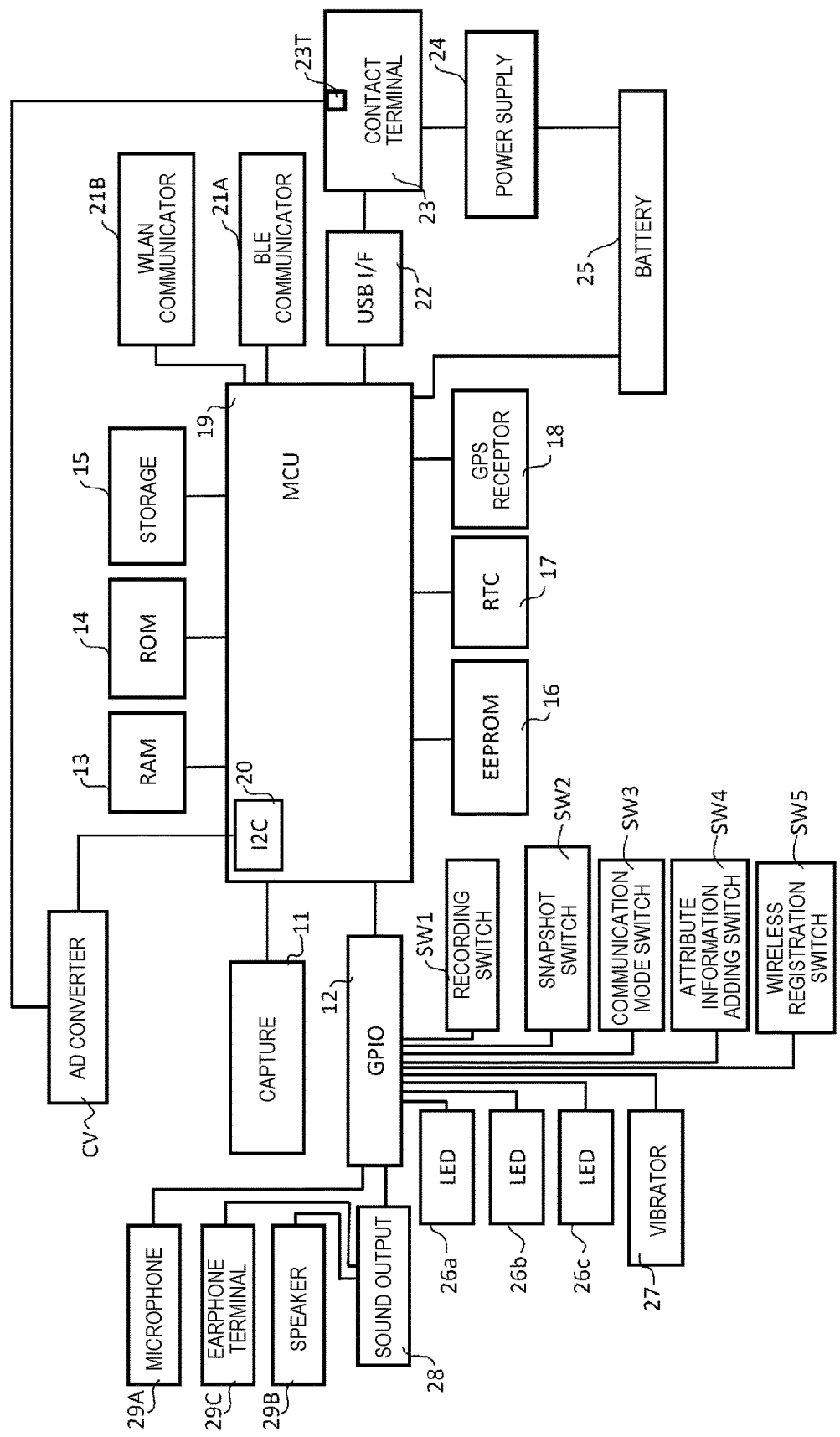
FIG. 4 is a block diagram illustrating in detail an example of the internal configuration of the wearable camera of each exemplary embodiment.

FIG. 4 is a block diagram illustrating in detail an example of the internal configuration of wearable camera 10 of each exemplary embodiment. Wearable camera 10 includes capture 11, general purpose input/output (GPIO) 12, random access memory (RAM) 13, read only memory (ROM) 14, and storage 15. Wearable camera 10 includes electrically erasable programmable ROM (EEPROM) 16, real time clock (RTC) 17, and global positioning system (GPS) receptor 18. Wearable camera 10 includes micro controller unit (MCU) 19, BLE communicator 21A, WLAN communicator 21B, USB interface (I/F) 22, contact terminal 23, power supply 24, and battery 25.

Wearable camera 10 includes recording switch SW1, snapshot switch SW2, communication mode switch SW3, attribute information adding switch SW4, and wireless registration switch SW5.

Wearable camera 10 includes three light emitting diodes (LEDs) 26a, 26b, and 26c, vibrator 27, sound output 28, microphone 29A, speaker 29B, and earphone terminal 29C. LEDs 26a, 26b, and 26c, vibrator 27, and sound output 28 function as an example of a notifier notifying the user.

Capture 11 includes capturing lens 11z (see FIG. 3), and a solid-state capturing device such as a charge coupled device (CCD) type image sensor or a complementary metal oxide semiconductor (CMOS) type image sensor. Capture 11 outputs data of the image based on the image of the subject obtained by capturing to MCU 19.

Detection terminal 23T of contact terminal 23 is a terminal at which a voltage change occurs, in a case where wearable camera 10 is placed (set) on charging stand 200 or gang charger, or it is detached from charging stand 200 or gang chaser. Detection terminal 23T of contact terminal 23 is connected to AD converter CV. A signal indicating the voltage change of detection terminal 23T is converted into a digital signal by AD converter CV, and the digital signal is input to MCU 19 through I2C 20.

GPIO 12 is a parallel interface. GPIO 12 is connected to recording switch SW1, snapshot switch SW2, communication mode switch SW3, attribute information adding switch SW4, wireless registration switch SW5, LED 26a, 26b, and 26c, vibrator 27, sound output 28, microphone 29A, speaker 29B, and earphone terminal 29C. GPIO 12 inputs and outputs signals between these various electronic components and MCU 19.

Microphone 29A picks up sounds around wearable camera 10, and outputs sound data of the picked-up sound to MCU 19 through GPIO 12. Microphone 29A may be a built-in microphone housed in casing 10z of wearable camera 10 or may be a wireless microphone connected to wearable camera 10 in a wireless manner. In the case of a wireless microphone, it is possible to increase the sound pickup performance by the police officer placing the wireless microphone in any place.

Sound output 28 outputs a sound signal relating to the operation of wearable camera 10 according to the instruction of MCU 19. Sound output 28 reads sound data having sound of a default message which has been stored in advance in ROM 14 or the like, and outputs a sound signal based on the sound data from speaker 29B. Earphone terminal 29C outputs a sound signal output from sound output 28 to the earphone connected to earphone terminal 29C. Speaker 29B receives the sound signal output from sound output 28 and outputs sound.

AD converter CV is connected to MCU 19 through a communication interface such as inter-integrated circuit (I2C) 20. It is possible to obtain a similar effect by connecting detection terminal 23T of contact terminal 23 to GPIO 12 without passing through AD converter CV.

RAM 13 is, for example, a working memory used in the operation of MCU 19. ROM 14 stores in advance a program and data for controlling the execution of the operation (process) of MCU 19.

Storage 15 as an example of a first memory is configured with, for example, a storage medium such as a memory card, and starts data recording (that is, recording) of the image captured by capture 11, based on, for example, an instruction to start recording based on the operation of police officer 3, or an instruction to start recording from common trigger box 100. Storage 15 constantly pre-buffers and holds the data of an image for a predetermined time (for example, 30 seconds) captured by capture 11, and continues constantly accumulating the image data up to a predetermined time (for example, 30 seconds) before from the current time. Upon receiving an instruction to start recording, storage 15 starts recording of the image data and continues recording the image data until receiving an instruction to stop recording. Further, storage 15 has a setting data file in which resolution upgrade information or the like is set. For example, when storage 15 is configured with a memory card, it is detachably attached to casing 10z of wearable camera 10.

EEPROM 16 stores, for example, identification information (for example, a serial number as a camera ID) for identifying wearable camera 10, and various types of setting information. RTC 17 counts the current time information and outputs it to MCU 19.

GPS receptor 18 receives satellite signals including the signal transmission times and position coordinates transmitted from a plurality of GPS transmitters (for example, four navigation satellites), and outputs them to MCU 19. MCU 19 calculates the current position coordinates of wearable camera 10 and the reception time of the satellite signal using a plurality of satellite signals. The calculation may be executed not by MCU 19 but by GPS receptor 18. The reception time information may also be used to correct the system time of wearable camera 10 (that is, the output of RTC 17). The system time is used for recording the capturing time of the captured image (including a still image and a moving image), and the like.

MCU 19 has a function as a controller of wearable camera 10, and performs, for example, a control process for integrally controlling the operation of each unit of wearable camera 10, a data input and output process between respective units of wearable camera 10, a data operation (calculation) process, and a data storage process. MCU 19 operates in accordance with various programs and data stored in ROM 14. At the time of operation, MCU 19 uses RAM 13 to obtain current time information from RTC 17 and obtain current position information from GPS receptor 18.

BLE communicator 21A as an example of the first communicator performs wireless communication, with smartphone 40, common trigger box 100, or the like, using the communication mode of Bluetooth (registered trademark) low energy (BLE) which is a communication standard of the short range wireless communication. BLE is a designation of version 4.0 of Bluetooth (registered trademark). Although BLE can communicate with low power consumption, its communication speed is as low as 100 kbps.

WLAN communicator 21B as an example of a first communicator is connected to smartphone 40 as the wireless LAN access point using a tethering function, wireless LAN access point 45, wireless LAN access point 63 of wireless LAN that can be used in police department PD, or the like with the wireless LAN (that is, WLAN), and performs wireless communication with the connection destination. Compared to BLE, the wireless LAN can communicate at a high communication speed of several tens to several hundreds Mbps, but since it is always connected with the wireless LAN access point, power consumption increases.

Wearable camera 10 may have a configuration (not shown) of a communicator for performing short-distance wireless communication such as near field communication (NFC) or wireless communication using a mobile circuit network (for example, long term evolution (LTE)), in addition to BLE communication and WLAN communication.

USB interface 22 is a serial bus, and enables connection with, for example, in-vehicle PC 32 and back end clients 70a and 70b in police department PD.

Contact terminal 23 is a terminal for electrically connecting with charging stand 200, and is connected to MCU 19 through USB interface 22 and also connected to power supply 24. Power supply 24 charges battery 25 in response to detection of the connection with charging stand 200 in contact terminal 23. In response to the connection with charging stand 200, contact terminal 23 can communicate the data of images read from storage 15 by MCU 19 to an external device (for example, common trigger box 100) connected through charging stand 200.

Detection terminal 23 is provided with, for example, "charging terminal V+" (not shown), "detection terminal 23T", "data terminals D− and D+" (not shown), and "ground terminal" (not shown). Detection terminal 23T is a terminal for detecting voltage and voltage change. Data terminals D− and D+ are terminals for transferring, for example, the data of images captured by wearable camera 10 to in-vehicle PC 32 through a USB connector terminal. Detection terminal 23T of contact terminal 23 is connected to a communication interface such as I2C 20 through AD converter CV, and the detected voltage value of contact terminal 23 is input to MCU 19.

If contact terminal 23 and the connector of charging stand 200 are connected, data communication between wearable camera 10 and an external device (for example, common trigger box 100) becomes possible.

Power supply 24 supplies charging current supplied from an external power supply (for example, common trigger box 100, a cigar charger in police vehicle 7, or an accessory in police vehicle 7) connected to charging stand 200 through contact terminal 23 to battery 25 and charges the battery 25.

Battery 25 is configured with, for example, a rechargeable secondary battery, and supplies power to each unit of wearable camera 10.

For example, recording switch SW1 is a push button switch for inputting an operation instruction of start or stop of recording (capturing of a moving image) by a pressing operation of police officer 3. MCU 19 may start recording (capturing of a moving image) when recording switch SW1 is pressed for a short time, and end the recording when recording switch SW1 is pressed for a long time. In addition, MCU 19 may start recording (capturing of an moving image) when recording switch SW1 is pressed for odd number of times, and end recording when recording switch SW1 is pressed for even number of times.

For example, snapshot switch SW2 is a push button switch for inputting an operation instruction to capture a still image by a pressing operation of police officer 3. For example, every time snapshot switch SW2 is pressed, MCU 19 captures the still image when it is pressed.

For example, communication mode switch SW3 is a slide switch for inputting an operation instruction for setting a communication mode between wearable camera 10 and an external device. Examples of the communication mode include an access point mode, a station mode, and an OFF mode.

In the access point mode, wearable camera 10 operates as an access point of the wireless LAN, is connected to, for example, smartphone 40 possessed by police officer 3 in a wireless manner, and performs communication between wearable camera 10 and smartphone 40. In the access point mode, when being connected to wearable camera 10, smartphone 40 displays the current live image by wearable camera 10, play backs the recorded image, displays the captured still image, and the like.

In the station mode, when being connected to an external device using a wireless LAN, communication is performed, with an external device as an access point. For example, smartphone 40 may be set as an external device by using the tethering function of smartphone 40. In the station mode, wearable camera 10 can perform various settings, transfer (upload) of recorded images held by wearable camera 10, or the like, with respect to in-vehicle camera system 30, and back end client 70 or back end server 50 in police department 4.

In the OFF mode, the communication operation of the wireless LAN is turned off and the wireless LAN is not used.

Attribute information adding switch SW4 is a push button switch operated to add attribute information to image data. The attribute information indicates the content (for example, type of incident, homicide, robbery, disaster, or the like) of the image captured by wearable camera 10.

Wireless registration switch SW5 as an example of the first indicator is a push button switch operated when wearable camera 10 registers and sets (hereinafter referred to as "communication setting process" in some cases) an external device (for example, smartphone 40, wireless LAN access point 45, or common trigger box 100) of a communication partner of wireless communication (for example, wireless communication using BLE or a wireless LAN). Hereinafter, for example, in wireless communication using BLE, a process of registering and setting a device which is a communication partner may be referred to as "pairing" in some cases.

LED 26a is a display that indicates, for example, the power input state (on/off state) of wearable camera 10 and the state of the battery 25.

LED 26b is a display that indicates, for example, the state (recorded state) of the capturing operation of wearable camera 10.

LED 26c is a display indicating, for example, the state of the communication mode of wearable camera 10. When wearable camera 10 receives notification data from back end server 50, three LEDs 26a to 26c perform a blinking operation in response to an instruction from MCU 19. At this time, according to the information on the sound source included in the notification data, MCU 19 changes the blinking pattern of LEDs 26a to 26c.

MCU 19 detects the input for each of recording switch SW1, snapshot switch SW2, communication mode switch SW3, attribute information adding switch SW4, and wireless registration switch SW5, and performs a process according to the input of the operated switch.

In a case of detecting the operation input of recording switch SW1, MCU 19 controls the start or stop of the capturing operation in capture 11 and stores the image obtained from capture 11 in storage 15 as a moving image.

In a case of detecting the operation input of snapshot switch SW2, MCU 19 stores the image by capture 11 when snapshot switch SW2 is operated, in storage 15, as a still image.

MCU 19 detects the state of communication mode switch SW3 and operates communicator 21 according to the communication mode corresponding to the setting of communication mode switch SW3.

In a case where attribute information adding switch SW4 is pressed, MCU 19 adds attribute information corresponding to the data of the image captured by capture 11 in association with the image.

In a case where wireless registration switch SW5 is pressed, MCU 19 executes a default process that is to be performed in the communication setting process (for example, pairing), on the surrounding external device (for example, common trigger box 100) that can be a communication partner of wearable camera 10. Here, if pairing is exemplified, the default process includes generation of registration request information as a communication partner of wireless communication and output thereof to BLE communicator 21A, generation of connection information for specifying a communication partner as a connection destination and output thereof to BLE communicator 21A, and storage of connection information transmitted from the communication partner in storage 15. However, it goes without saying that the default process relating to the communication setting of the wireless LAN is the same as the default process when exemplifying the above-mentioned pairing.

Figure 5:
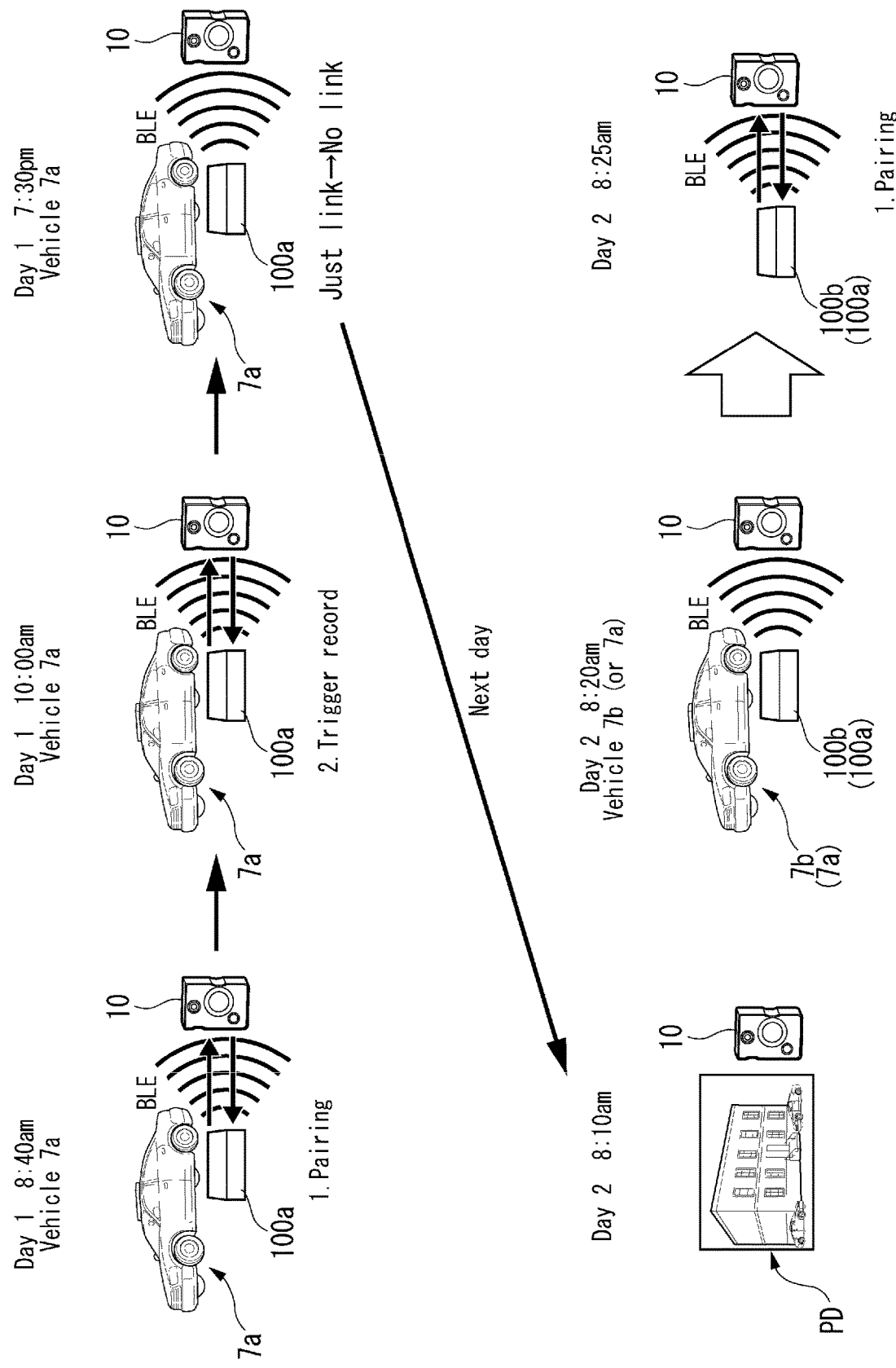
FIG. 5 is an explanatory diagram illustrating an example of an outline of an operation of communication between the wearable camera and a common trigger box in Exemplary embodiment 1.

FIG. 5 is an explanatory diagram illustrating an example of an outline of an operation of communication between wearable camera 10 and common trigger box 100 in Exemplary embodiment 1. As described above, according to the operation in police department PD to which a police officer belongs, with respect to police vehicles on which the police officer rides, there are an operation in which the police vehicles are fixed on a daily basis, and an operation in which the police vehicles are changed every day. Here, in order to explain the contents of Exemplary embodiment 1 in an easy-to-understand manner, an explanation will be made assuming that a police vehicle on which the police officer rides is changed every day.

Under the operation in which the police vehicle on which the police officer rides is changed every day, MCU 19 as an example of the first communication setter executes pairing as an example of the communication setting process between wearable camera 10 used by the police officer and common trigger box 100a mounted in police vehicle 7a, by using for example, an existing AirStation One-Touch Secure System (AOSS (registered trademark)) technique, when the police officer rides on police vehicle 7a on the first day (Day 1).

For example, wireless registration switch SW5 of wearable camera 10 and switch 170 (see FIG. 8) of common trigger box 100 are pressed together, although details will be described later. By pressing the respective switches, wearable camera 10 and common trigger box 100 both establish an encrypted communication session, send their own connection information to each other through the encrypted communication session, and receive and store it. Thus, wearable camera 10 and common trigger box 100 can register and set each other as a communication partner of wireless communication using for example, BLE, and thereafter can perform wireless communication with each other.

However, on the second day (Day 2), the police officer rides on police vehicle 7b different from police vehicle 7a. The police officer uses same wearable camera 10, but pairing related to wireless communication using BLE needs to be performed between wearable camera 10 and common trigger box 100b mounted on police vehicle 7b. That is, unless pairing is completed, wireless communication using BLE is impossible between wearable camera 10 and common trigger box 100b. The police officer is not able to check whether or not communication setting information (hereinafter may be referred to as "pairing information" in some cases) based on the pairing executed by wearable camera 10 on the first day (Day 1) remains in wearable camera 10. Therefore, for example, when a police officer comes to a parking lot in police department PD for patrolling or to rush to a field of incident, it is assumed that the police officer forget to perform pairing of wireless communication between wearable camera 10 and common trigger box 100b in police vehicle 7b on which the police officer is supposed to ride on the second day (Day 2). In this case, for example, if pairing information based on the pairing executed on the first day (Day 1) remains in wearable camera 10, wearable camera 10 cannot perform wireless communication using BLE with police vehicle 7b on which the police officer is supposed to ride on the second day (Day 2), which hinders the operation of the police officer.

Therefore, in Exemplary embodiment 1, as shown in FIG. 5, MCU 19 as an example of the first controller of wearable camera 10 deletes the pairing information stored therein after a certain period (for example, 12 hours) has elapsed without performing BLE communication after completion of pairing with the communication partner corresponding to the pairing information. In a case where common trigger box 100 detects that a certain period (for example, 12 hours) has elapsed without communication, it is possible to obtain a similar effect by deleting the pairing information on common trigger box 100 side.

A detailed description will be made with reference to FIG. 5.

At 8:40 am on the first day (Day 1), if a police officer comes to the parking lot to start a patrol work, pairing of BLE communication between common trigger box 100a mounted in police vehicle 7a and wearable camera 10 is executed. Thus, wearable camera 10 and common trigger box 100a perform BLE communication with each other. Pairing may be, for example, a method using AOSS (registered trademark) technology described above, or a standard method of Bluetooth (registered trademark) or another method may be used.

At 10:00 am on the first day (Day 1), for example, the police officer arrives at the field of incident, and if wearable camera 10 receives the control signal to start recording from common trigger box 100a through BLE communication, wearable camera 10 starts recording. That is, pairing makes it possible to send and receive between wearable camera 10 and common trigger box 100a, and wearable camera 10 can start or stop recording the captured image under the control of common trigger box 100a.

At 7:30 p.m. on the first day (Day 1), the police officer returns to police department PD, and is away from common trigger box 100 by a certain distance, while wearing or possessing wearable camera 10. The certain distance is for example, within the communication range of BLE communication. Thus, pairing (link) between wearable camera 10 and common trigger box 100a in police vehicle 7a is released.

It is assumed that at 8:10 am on the second day (Day 2), the police officer wears or possesses wearable camera 10 and enters police department PD. The police officer may wear or possess wearable camera 10 used by himself after entering police department PD. In the present exemplary embodiment, wearable camera 10 deletes pairing information (specifically, pairing information of BLE communication with common trigger box 100a of police vehicle 7a) stored in storage 15, after a lapse of a certain time (for example, 12 hours) from a last communication time (in other words, a time immediately before pairing (link) between wearable camera 10 and common trigger box 100a is released). Specifically, around 7:30 am on the second day (Day 2), wearable camera 10 deletes the pairing information stored in storage 15 (specifically, pairing information of BLE communication with common trigger box 100*a* in police vehicle 7*a*). Therefore, at the time of 8:10 am on the second day (Day 2), wearable camera 10 does not hold the pairing information generated based on the pairing process executed at 8:40 am on the first day (Day 1). On this day, police officer rides on police vehicle 7*b* different from police vehicle 7*a*. For the sake of simplifying the explanation, an example in which the police officer rides on police vehicle 7*b* has been described, but the police officer may ride on same police vehicle 7*a* as on the first day (Day 1).

At 8:20 am on the second day (Day 2), if the police officer comes to the parking lot to go out for patrol, wearable camera 10 receives the signal from common trigger box 100*b* in police vehicle 7*b* to detect common trigger box 100*b*. However, since pairing between wearable camera 10 and common trigger box 100*b* is not executed at this time, wearable camera 10 and common trigger box 100*b* cannot perform BLE communication with each other. When receiving and detecting the signal from common trigger box 100*b*, wearable camera 10 notifies the police officer that pairing is not executed between wearable camera 10 and common trigger box 100*b* of police vehicle 7*b*, for example, by the vibration of vibrator 27. Thus, the police officer can recognize that pairing has not yet been completed between wearable camera 10 and common trigger box 100*b* in police vehicle 7*b* on which the police officer is supposed to ride on the second day (Day 2).

At 8:25 am on the second day (Day 2), the police officer receives, for example, the vibration of vibrator 27, and executes pairing of the BLE communication between common trigger box 100*b* mounted on the police vehicle 7*b* and wearable camera 10. Thus, wearable camera 10 and common trigger box 100*b* perform BLE communication with each other.

FIG. 7A is a diagram illustrating an example of pairing information registered in a case where wearable camera 10 in each exemplary embodiment performs BLE communication. FIG. 7B is a diagram illustrating an example of pairing information registered in a case where common trigger box 100 in each exemplary embodiment performs BLE communication. FIG. 7C is a diagram illustrating an example of communication setting information registered in a case where wearable camera 10 in each exemplary embodiment performs WLAN communication. FIG. 7D is a diagram illustrating an example of communication setting information registered in a case where common trigger box 100 in each exemplary embodiment performs WLAN communication. FIG. 7E is a diagram illustrating an example of communication setting information registered in a case where common trigger box 100 in each exemplary embodiment performs WLAN communication.

As shown in FIG. 7A, when BLE communication is performed, wearable camera 10 stores media access control (MAC) address and an encryption key used for BLE communication, respectively, for each common trigger box 100 which is a connection destination, as pairing information (that is, connection information of common trigger box 100 as a communication partner) as an example of communication setting information. In FIG. 7A, connection information of two common trigger boxes 100, as communication partners with which wearable camera 10 performs BLE communication, is registered as pairing information.

As shown in FIG. 7B, when BLE communication is performed, common trigger box 100 stores MAC address and an encryption key used for BLE communication, respectively, for each wearable camera 10 which is a connection destination, as pairing information as an example of communication setting information (that is, connection information of wearable camera 10 as a communication partner). In FIG. 7B, the number of registration destinations to be paired by common trigger box 100 (that is, communication partners with which common trigger box 100 performs BLE communication) is up to 10, but the connection information of six wearable cameras 10 is registered as pairing information.

As shown in FIG. 7C, in the case where WLAN communication (for example, Wifi (registered trademark) communication) is performed, wearable camera 10 stores service set identifier (SSID) and an encryption key used for WLAN communication, respectively, for each common trigger box 100 which is a connection destination, as communication setting information (that is, connection information of common trigger box 100 as a communication partner). In FIG. 7C, connection information of two common trigger boxes 100, as communication partners with which wearable camera 10 performs WLAN communication, is registered as communication setting information.

As shown in FIG. 7D, in the case of WLAN communication (for example, Wifi (registered trademark) communication), common trigger box 100 stores a network key (encryption key) used for a wireless LAN with a connection destination (that is, wearable camera 10 as a communication partner).

As shown in FIG. 7E, when WLAN communication (for example, Wifi (registered trademark) communication) is performed, common trigger box 100 stores MAC address, respectively, for each wearable camera 10 which is a connection destination, as communication setting information (that is, connection information of wearable camera 10 as a communication partner). In FIG. 7E, the number of registration destinations to which the common trigger box 100 sets communication (that is, the communication partner with which the common trigger box 100 performs WLAN communication) is up to 10, but the connection information of six wearable cameras 10 is registered as communication setting information.

Figure 6:
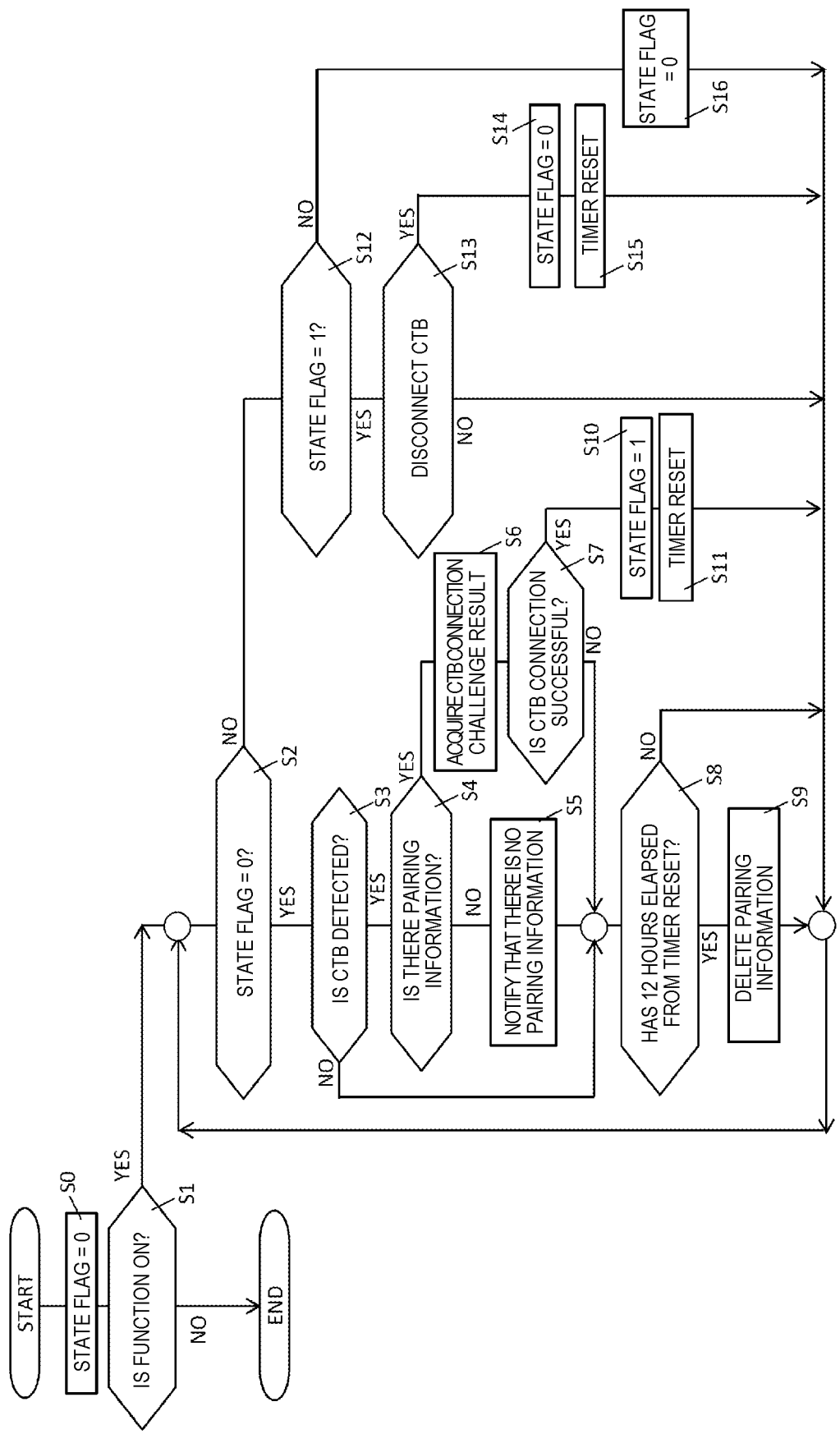
FIG. 6 is a flowchart illustrating in detail an example of an operation procedure of the wearable camera in Exemplary embodiment 1.

FIG. 6 is a flowchart illustrating in detail an example of an operation procedure of wearable camera 10 in Exemplary embodiment 1. FIG. 6 illustrates a pairing non-execution notifying function of notifying that wearable camera 10 does not generate pairing information for wireless communication (for example, BLE communication) with common trigger box 100 in police vehicle 7 (in other words, pairing is not executed), in this case. The illustration of FIG. 6 can be similarly applied to the case where wearable camera 10 and common trigger box 100 perform wireless LAN communication (WLAN communication).

In FIG. 6, wearable camera 10 initializes a state flag (S0). That is, wearable camera 10 sets the state flag to 0 (S0). After this initialization, MCU 19 determines whether to use the pairing non-execution notifying function described above (ON) or not to use it (OFF) in wearable camera 10 (S1). For example, setting information indicating whether to use or not to use the pairing non-execution notification function is stored in storage 15. MCU 19 makes a determination based on the setting information stored in storage 15. In a case where it is set not to use the pairing non-execution notifying function (OFF) (NO in S1), the process of wearable camera 10 shown in FIG. 6 is ended.

On the other hand, in a case where it is set to use the pairing non-execution notifying function (ON) (YES in S1), MCU 19 refers to, for example, the state flag stored in RAM 13 or storage 15 (S2). The state flag is 0 (zero) or 1. The state flag 0 (zero) indicates an initial state (that is, whether wearable camera 10 and common trigger box 100 are connected or not is not checked by wearable camera 10), or a state where wearable camera 10 and common trigger box 100 are disconnected. On the other hand, the status flag 1 indicates a state where wearable camera 10 and common trigger box 100 are connected, or a state where the connection is maintained.

In a case where it is determined that the state flag is 0 (zero) (YES in S2), MCU 19 determines whether or not the signal from common trigger box 100 is received by BLE communicator 21A (S3). The signal from common trigger box 100 includes the identification number (for example, MAC address) of common trigger box 100. In a case where it is determined that the signal from common trigger box 100 is not received in BLE communicator 21A (NO in S3), for example, the police officer is on vacation and is at an officer home (see FIG. 1), or performs a desk work in the office within police department PD (that is, position away from common trigger box 100 from the BLE communication range). In this case, since the police officer does not ride on police vehicle 7, the process of wearable camera 10 proceeds to step S8.

On the other hand, in a case where it is determined that the signal from common trigger box 100 is received in BLE communicator 21A (YES in S3), MCU 19 blinks, for example, LED 26c in order to notify the police officer of the reception. The notification to the police officer that the signal from common trigger box 100 is received may be a unique vibration pattern of vibrator 27, or a sound output of a default sound message by sound output 28 and speaker 29B (for example, "a signal from common trigger box is received").

In a case where it is determined that the signal from common trigger box 100 is received in BLE communicator 21A (YES in S3), MCU 19 determines whether pairing information for BLE communication between common trigger box 100 corresponding to the identification number included in the signal and wearable camera 10 is held or not (S4).

In a case where it is determined that the pairing information is not held (NO in S4), MCU 19 notifies that pairing has not been executed yet with common trigger box 100 which is a transmission source of the signal received by BLE communicator 21A in step S3 (S5). MCU 19 makes a notification by using, for example, at least one of lighting of LED 26c, vibration of vibrator 27, and sound output of a default sound message through sound output 28 and speaker 29B. The default sound message is, for example, "pairing with the common trigger box necessary for wireless communication has not yet been completed", but it goes without saying that it is not limited to this content. For example, a police officer who recognizes the necessity of pairing by blinking of an LED, a unique vibration pattern, or a sound message performs pairing by a predetermined pairing method. Alternatively, after determining that the signal from common trigger box 100 is received in BLE communicator 21A, for example, pairing may be automatically performed by MCU 19 as an example of the first communication setter between wearable camera 10 and common trigger box 100, according to a method using the above-mentioned AOSS (registered trademark). The timing at which pairing is performed between wearable camera 10 and common trigger box 100 is not limited to this point in FIG. 6. For example, pairing may be performed between wearable camera 10 and common trigger box 100 after the notification of step S5.

On the other hand, in a case where it is determined that the pairing information is held (YES in S4), MCU 19 performs a connection attempt to common trigger box 100 using the pairing information (S6). That is, MCU 19 generates an authentication request to common trigger box 100 by using the existing challenge response method, and transmits it to common trigger box 100.

More specifically, upon receiving the authentication request transmitted from wearable camera 10, common trigger box 100 transmits back a random notification sequence (that is, a challenge) to wearable camera 10. MCU 19 generates a numerical sequence (that is, a response) obtained by synthesizing a predetermined numerical sequence (a default numerical sequence between common trigger box 100 and wearable camera 10) and the challenge according to a specific algorithm, and transmits it to common trigger box 100. Common trigger box 100 generates a numerical sequence (that is, a response) obtained by synthesizing the challenge transmitted to wearable camera 10 and the above-mentioned predetermined numerical sequence (a default numerical sequence between common trigger box 100 and wearable camera 10) according to the same algorithm, and compares the response transmitted from wearable camera 10. If the responses match each other, the authentication request of wearable camera 10 is successful, and the connection attempt to common trigger box 100 of wearable camera 10 is successful.

In a case where it is determined that the connection attempt to common trigger box 100 has failed (NO in S7), MCU 19 determines whether or not a certain time (for example, 12 hours) has elapsed from the timer reset (see steps S11 and S15) (S8). In a case where the signal from common trigger box 100 is not received (NO in S3) in step S3, or even after the notification (S5) that the pairing with common trigger box 100 has not been executed yet in step S5, MCU 19 similarly determines whether or not a certain time (for example, 12 hours) has elapsed from the timer reset (S8). In a case where it is determined that a certain time (for example, 12 hours) has elapsed from the timer reset (NO in S8), the process of wearable camera 10 returns to the step S2.

On the other hand, in a case where it is determined that a certain time (for example, 12 hours) has elapsed from the timer reset (YES in S8), MCU 19 deletes the held pairing information (S9). After step S9, the process of wearable camera 10 returns to step S2. Even in a case where a certain time (for example, 12 hours) has elapsed from the timer reset, if the pairing information is not held in wearable camera 10, the process of step S9 may be omitted.

In a case where it is determined that the connection attempt to common trigger box 100 is successful (YES in S7), MCU 19 updates the state flag to 1 (S10) and resets the timer (not shown) (S11). The timer (not shown) is built in, for example, MCU 19. After step S11, the process of wearable camera 10 returns to step S2.

Further, in a case where it is determined that the status flag is not 0 (zero) (in other words, 1) (NO in S2), MCU 19 refers to the connection flag stored in, for example, RAM 13 or storage 15, and determines whether or not the connection flag is 1 (in other words, already connected to common trigger box 100) (S12). In a case where it is determined that the connection flag is 1 (YES in S12), MCU 19 determines whether or not the communication with common trigger box 100 has been disconnected (S13). In step S13, it is questioned whether or not the police officer who has worn or possessed for example, wearable camera 10 has moved to the outside of the communication range, where BLE communication with common trigger box 100 becomes impossible. In a case where the signal from common trigger box 100 is received by BLE communicator 21A (NO in S13), it is determined that the communication between wearable camera 10 and common trigger box 100 continues, and the process of wearable camera 10 returns to step S2.

On the other hand, in a case where it is determined that the communication with common trigger box 100 has been disconnected (YES in S13), MCU 19 updates the state flag to 0 (S14) and resets the timer (not shown) (S15). After step S15, the process of wearable camera 10 returns to step S2.

Further, in a case where it is determined that the connection flag is not 1 (that is, it is 0 (zero)) (NO in S12), MCU 19 updates the state flag to 0 (zero) (S16). After step S16, the process of wearable camera 10 returns to step S2.

As described above, in communication system 1000 of Exemplary embodiment 1, wearable camera 10 images the subject in front of the police officer (an example of the user). Wearable camera 10 executes pairing (an example of the first communication setting process) for communicating with common trigger box 100 installed in police vehicle 7 on which the police officer rides (one example of a vehicle), and stores pairing information (an example of first communication setting information) used for BLE communication with common trigger box 100 based on the pairing, in storage 15 (an example of a memory). Wearable camera 10 transmits an image of a subject captured by capture 11 to common trigger box 100 of police vehicle 7, using pairing information stored in storage 15. Wearable camera 10 deletes pairing information (first communication setting information) from storage 15, after a lapse of a certain time ((for example, 12 hours) from a last communication time in BLE communicator 21A, between common trigger box 100 which is a communication partner of BLE communicator 21A and wearable camera 10.

Thus, wearable camera 10 deletes communication setting information every time a certain time has elapsed from the last time of wireless communication with common trigger box 100 mounted on each police vehicle 7 on which the police officer rides, thereby supporting the periodic execution of setting of new wireless communication with common trigger box 100, for each police officer. For example, even in a case of changing police vehicle 7 on which the police officer rides on a daily basis, since wearable camera 10 can delete pairing information if a certain time has elapsed from the last communication with common trigger box 100 in police vehicle 7 on which the police officer rode the day before, thereby performing new wireless communication setting with common trigger box 100 in police vehicle 7 on which the police officer is supposed to ride on a different day. Therefore, since communication setting (pairing) between common trigger box 100 in police vehicle 7 on which the police officer is supposed to ride and wearable camera 10 is reliably performed, wearable camera 10 automatically performs, for example, the operation (that is, start or stop of recording) according to the control signal for starting or stopping recording from common trigger box 100, and efficiently supports the operation of the police officer.

In a case where the communication setting information of the wireless communication (for example, BLE or wireless LAN) with common trigger box 100 in police vehicle 7 is not stored, wearable camera 10 notifies that the communication setting process (for example, pairing) has not been performed. Thus, since the police officer can recognize that there is no pairing information with common trigger box 100 in police vehicle 7 on which the police officer is supposed to ride, it is possible to accurately perform the pairing with desired common trigger box 100 by using wearable camera 10.

Notifier is at least one of LED 26c as an example of an illuminator that illuminates that the communication setting process is not performed, vibrator 27 as an example of a vibrator that vibrates in a pattern indicating that the communication setting process is not performed, and sound output 28 and speaker 29B which output sound indicating that first communication setting process is not performed. Thus, the police officer can clearly recognize that there is no pairing information because pairing with common trigger box 100 in police vehicle 7 on which the police officer is supposed to ride is not executed.

In addition, wearable camera 10 notifies the police officer that the communication setting process is not performed, only when the signal transmitted from common trigger box 100 is received. This makes it possible for wearable camera 10 to avoid making a notification that the communication setting process is not performed. For example, until a police officer rides on or moves close to police vehicle 7 on which the police officer is supposed to ride (for example, until the police officer enters the communication range with common trigger box 100 of police vehicle 7), wearable camera 10 can avoid notifying that the wireless communication setting process between wearable camera 10 and common trigger box 100 is not performed.

(Process Leading to Exemplary Embodiment 2)

Figure 9A:
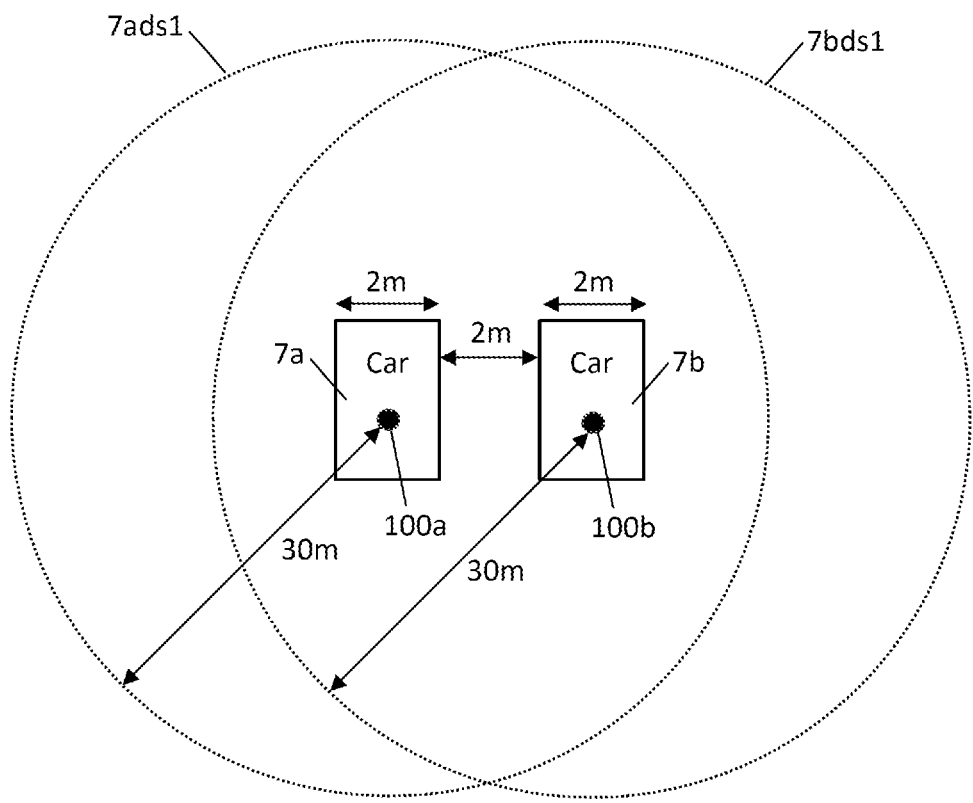
FIG. 9A is an explanatory diagram indicating an issue as the premise of Exemplary embodiment 2.

FIG. 9A is an explanatory diagram indicating an issue as the premise of Exemplary embodiment 2. A plurality of police vehicles 7a and 7b are parked in police department PD, but here, in order to make the explanation easier to understand, it is assumed that police vehicles are parked, for example, 2 meters (m) apart. Police vehicles 7a and 7b have, for example, the widths of 2 m. However, it goes without saying that the parking interval of police vehicles 7a and 7b is not limited to about 2 m in view of the size of the parking lot.

As shown in FIG. 9A, when the communication setting (for example, pairing) between wearable camera 10 and common trigger box 100a of police vehicle 7a is performed in a wireless manner, there is a possibility that common trigger box 100b of another police vehicle 7b present in wireless communication areas 7ads1 of common trigger box 100a and wearable camera 10 may be erroneously paired with each other. Wireless communication areas 7ads1 and 7bds1 of common trigger boxes 100a and 100b are for example, 30 meters (m), respectively, and indicate the communicable (receivable) range of the respective signals from common trigger boxes 100a and 100b. This problem is presumed to occur because common trigger boxes 100b and 100a of other police vehicles 7b and 7a are respectively located in wireless communication ranges 7ads1 and 7bds1 of common trigger boxes 100a and 100b of police vehicles 7a and 7b.

Exemplary Embodiment 2

Therefore, in Exemplary embodiment 2, for example, examples of communication system 1000 and common trigger box 100 that solve the above-mentioned problems by adopting two approaches will be described. Although the details will be described later, a first approach is a method in which common trigger box 100 performs setting of communication with wearable camera 10 after narrowing the wireless communication area (communication range), in a case where a communication setting button is pressed in wearable camera 10 and common trigger box 100 of police vehicle 7. A second approach is a method in which communication setting is performed after wearable camera 10 and common trigger box 100 are connected in a wired manner through charging stand 200.

Figure 8:
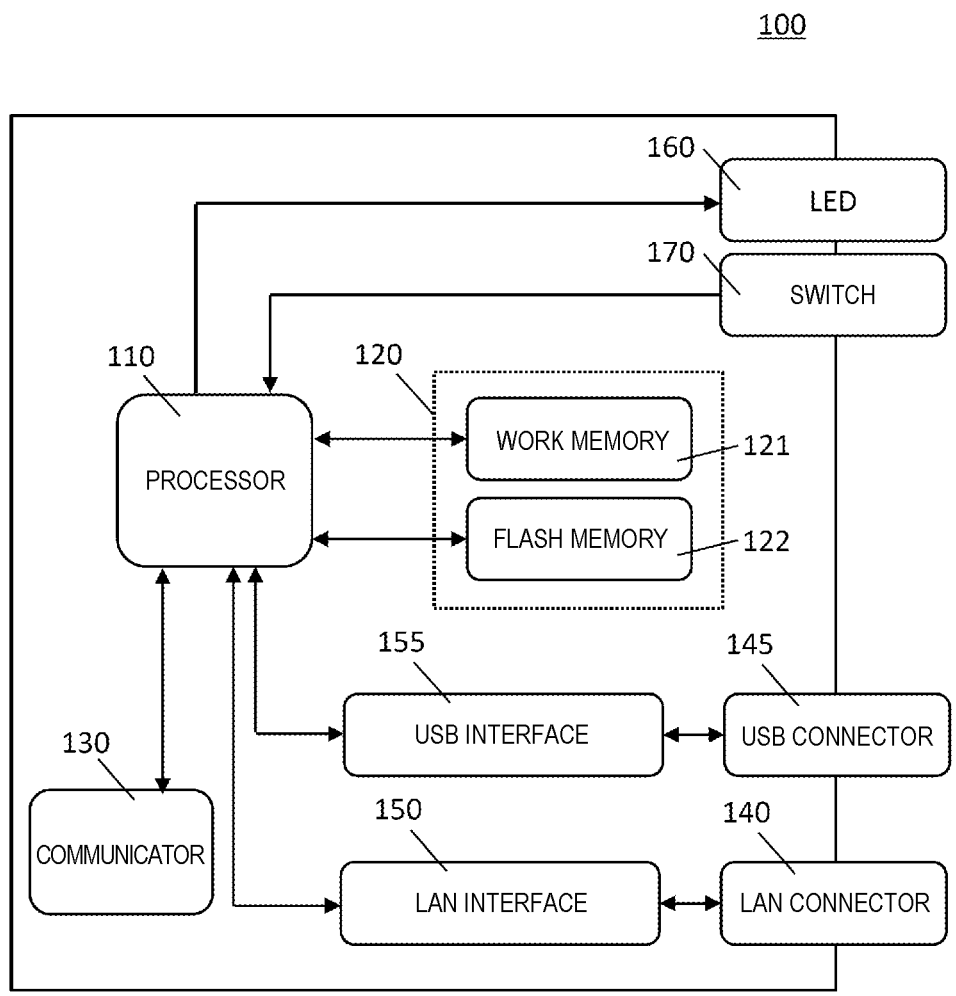
FIG. 8 is a block diagram illustrating in detail an example of the internal configuration of the common trigger box in each exemplary embodiment.

FIG. 8 is a block diagram illustrating in detail an example of the internal configuration of common trigger box 100 of each exemplary embodiment. Common trigger box 100 shown in FIG. 8 includes processor 110, memory 120, communicator 130, LAN connector 140, USB connector 145, LAN interface 150, USB interface 155, LED 160, and switch 170. For example, common trigger box 100 is mounted by being deployed in the trunk room of police vehicle 7.

Processor 110 is configured with, for example, a central processing unit (CPU), a micro processing unit (MPU), or a digital signal processor (DSP), and has a function of a controller of common trigger box 100. Processor 110 executes, for example, a control process for integrally controlling the operation of each unit of common trigger box 100, a data input and output process with respective units of common trigger box 100, a data operation (calculation) process, and a data storage process. Processor 110 operates according to various programs and data stored in flash memory 122.

Memory 120 as an example of the second memory includes work memory 121 and flash memory 122. Work memory 121 is configured using for example, a random access memory (RAM), and is used at the time of operation of processor 110. Flash memory 122 holds in advance a program and data for controlling the execution of the operation (process) of processor 110, or stores various types of data generated by the operation (process) of processor 110 or various types of data transmitted from the external devices (for example, wearable camera 10, in-vehicle camera system 30).

Communicator 130 as an example of the second communicator includes a wired communication circuit (not shown) for performing wired communication (for example, LAN communication), and a wireless communication circuit (not shown) for performing wireless communication (for example, BLE communication, wireless LAN communication). Communicator 130 transmits and receives data using a wire with an external device (for example, charging stand 200, in-vehicle camera system 30, rotation warning light PL, and siren (not shown)) connected with common trigger box 100 in a wired manner. Common trigger box 100 may be connected to in-vehicle PC 32 by a wire. In this case, communicator 130 transmits and receives data using a wire with in-vehicle PC 32. Communicator 130 transmits and receive data in a wireless manner to and from an external device (for example, wearable camera 10) connected with common trigger box 100 in a wireless manner.

LAN connector 140 is a default connector used when performing LAN communication with an external device (for example, charging stand 200, in-vehicle camera system 30, rotation warning light PL, and siren (not shown)) connected to common trigger box 100 through a LAN cable (not shown, for example, a crossover cable or a straight cable). LAN interface 150 is a communication interface between LAN connector 140 and processor 110, and performs input and output of data between LAN connector 140 and processor 110. Although details will be described in Exemplary embodiment 3, LAN interface 150 includes GPIO 151 (see FIG. 12, that is, a parallel interface) to which an output of a signal (SIG) terminal of the LAN cable (for example, a crossover cable) is input.

USB connector 145 is a default connector used when performing USB communication with an external device (for example, charging stand 200, in-vehicle camera system 30, rotation warning light PL, and siren (not shown)) connected to common trigger box 100 through a USB cable (not shown). USB interface 155 is a communication interface between USB connector 145 and processor 110, and performs input and output of data between USB connector 145 and processor 110.

LED 160 is configured using for example, a plurality of light emission diodes (LEDs). In response to a control signal from processor 110, LED 160 is turned on or turned off to notify whether or not the power supply of common trigger box 100 is turned on. In response to a control signal from processor 110, LED 160 is turned on or turned off to notify whether or not BLE communication is being performed. In response to a control signal from processor 110, LED 160 is turned on or turned off to notify whether or not wireless LAN communication is being performed.

Switch 170 as an example of the second indicator is a push button switch operated when the external device (for example, wearable camera 10) of the partner with which common trigger box 100 performs wireless communication (for example, wireless communication using BLE or a wireless LAN) is registered and set as a communication partner (that is, during the communication setting process). A signal indicating that switch 170 is pressed is input to processor 110.

Figure 9B:
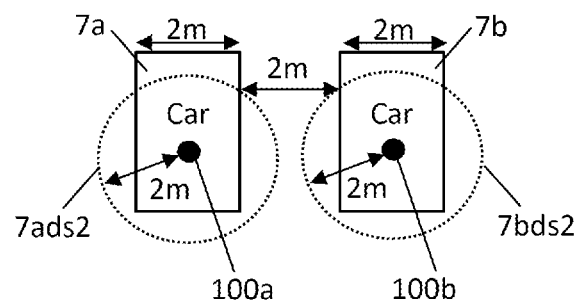
FIG. 9B is an explanatory diagram illustrating an example of an outline of an operation of a common trigger box in Exemplary embodiment 2.
Figure 10:
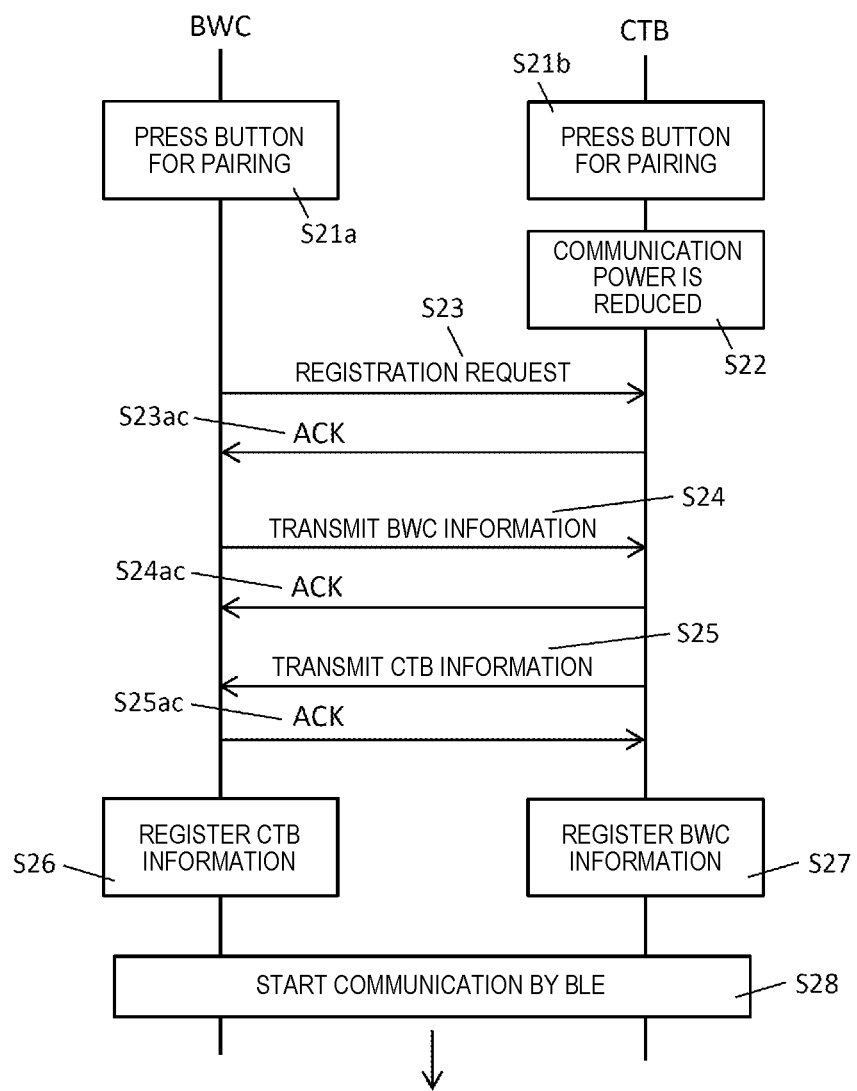
FIG. 10 is a sequence diagram illustrating in detail a first example of an operation procedure regarding pairing between the wearable camera and the common trigger box in Exemplary embodiment 2.

Next, the outline and operation procedure of the first approach in Exemplary embodiment 2 will be described with reference to FIG. 9B and FIG. 10. FIG. 9B is an explanatory diagram illustrating an example of an outline of an operation of common trigger box 100 in Exemplary embodiment 2. FIG. 10 is a sequence diagram illustrating in detail a first example of an operation procedure regarding pairing between wearable camera 10 and common trigger box 100 in Exemplary embodiment 2. In the following first approach, BLE communication as an example of wireless communication is exemplified and a communication setting process (that is, pairing as an example of the second communication setting process) for performing BLE communication is described, but it is similarly applicable even if wireless LAN communication is exemplified.

In FIG. 9B, similarly to FIG. 9A, a plurality of police vehicles 7a and 7b are parked in police department PD, but here, in order to make the explanation easier to understand, it is assumed that police vehicles are parked, for example, 2 meters (m) apart. Police vehicles 7a and 7b have, for example, the widths of 2 m. However, it goes without saying that the parking interval of police vehicles 7a and 7b is not limited to about 2 m in view of the size of the parking lot.

As shown in FIG. 9B, in a case where respective communication setting buttons are pressed in wearable camera 10 and common trigger box 100a of police vehicle 7a, common trigger box 100a temporarily reduces power during communication in communicator 130. Even in common trigger box 100b of police vehicle 7b, when performing the communication setting process with wearable camera 10 used by another police officer, if the communication setting button is pressed by the police officer, similarly, common trigger box 100b temporarily reduces the power (power) during communication in communicator 130. Thus, common trigger boxes 100a and 100b can narrow the wireless communication area (communication range) only for a certain period when performing the communication setting process (for example, pairing) with wearable cameras 10 which are the respective communication partners thereof, and it is possible to avoid two-dimensional planar overlap with the wireless communication area (communication range) of common trigger boxes 100b and 100a of other police vehicles 7*b* and 7*a*. The communication setting button in wearable camera 10 is wireless registration switch SW5, and the communication setting button in common trigger boxes 100*a* and 100*b* is switch 170.

Wireless communication areas 7*ads*2 and 7*bds*2 of common trigger boxes 100*a* and 100*b* are temporarily narrowed by common trigger boxes 100*a* and 100*b*, and are narrower than wireless communication areas 7*ads*1 and 7*bds*1 which are not narrowed. Wireless communication areas 7*ads*2 and 7*bds*2 of common trigger boxes 100*a* and 100*b* are for example, 2 meters (m), respectively, and indicate the respective communicable (receivable) ranges of signals from common trigger boxes 100*a* and 100*b*.

In FIG. 10, a button for pairing of wearable camera 10 (that is, wireless registration switch SW5) is pressed by the police officer (S21*a*), and a button for pairing of common trigger box 100 (that is, switch 170) is pressed (S21*b*). When detecting the press of switch 170 in step S21*b*, common trigger box 100 reduces the power during communication in communicator 130 for a certain period (a default value) (S22). Thus, as shown in FIG. 9B, common trigger box 100 can narrow the wireless communication area (communication range) only for a certain period when performing pairing with wearable camera 10 which is the communication partner.

By pressing each switch, wearable camera 10 and common trigger box 100 both establish an encrypted communication session. Wearable camera 10 generates a pairing registration request through the encrypted communication session and transmits it to common trigger box 100 (S23). Upon receiving the registration request transmitted in step S23, common trigger box 100 returns an acknowledgment (ACK) indicating the reception of pairing registration request through the encrypted communication session in the same way (S23*ac*). Hereinafter, during a process in pairing between wearable camera 10 and common trigger box 100, information is transmitted and received through the encrypted communication session.

Wearable camera 10 transmits its own connection information (BWC information) to common trigger box 100 (S24). Upon receiving the connection information (BWC information) transmitted in step S24, common trigger box 100 returns an acknowledgment (ACK) indicating the reception of the connection information (for example, BWC information as an example of second communication setting information) (S24*ac*).

Common trigger box 100 transmits its own connection information (CTB information) to wearable camera 10 (S25). Upon receiving the connection information (CTB information) transmitted in step S25, wearable camera 10 returns an acknowledgment (ACK) indicating the reception of the connection information (CTB information) (S25*ac*). Thus, wearable camera 10 and common trigger box 100 transmit and receive their own connection information with each other to exchange it.

Wearable camera 10 registers the received connection information (CTB information) in storage 15 and stores it (S26). Common trigger box 100 registers the received connection information (BWC information) in flash memory 122 and stores it (S27). Thus, wearable camera 10 and common trigger box 100 can start wireless communication using BLE communication (S28).

Figure 11A:
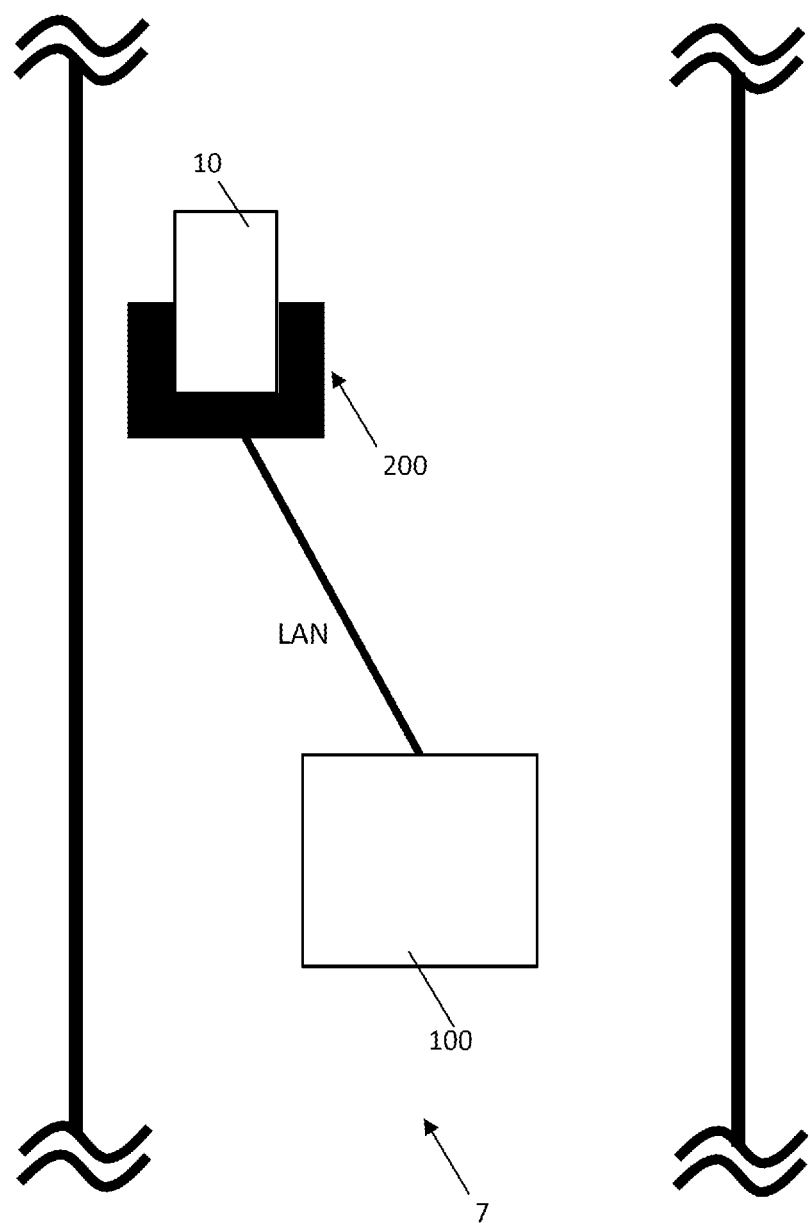
FIG. 11A is a diagram illustrating an example of LAN communication performed between the wearable camera and the common trigger box through a charging stand in Exemplary embodiment 2.

Next, the outline and operation procedure of the second approach in Exemplary embodiment 2 will be described with reference to FIG. 11A and FIG. 11B. FIG. 11A is a diagram illustrating an example of LAN communication performed between wearable camera 10 and common trigger box 100 through charging stand 200 in Exemplary embodiment 2. FIG. 11B is a sequence diagram illustrating in detail a second example of an operation procedure regarding pairing between wearable camera 10 and common trigger box 100 in Exemplary embodiment 2.

As shown in FIG. 11A, in the second approach, wearable camera 10 is connected to charging stand 200 and charging stand 200 and common trigger box 100 are connected by a LAN cable (for example, a straight cable). In other words, when wearable camera 10 is connected to charging base 200, wearable camera 10 is connected to common trigger box 100 so as to enable LAN communication through charging stand 200.

In FIG. 11B, if a police officer places (inserts) wearable camera 10 on a predetermined charging surface of charging stand 200, it is assumed that wearable camera 10 is set on charging stand 200 (S29). Wearable camera 10 can determine that it is connected to charging stand 200 from the output of contact terminal 23. Further, wearable camera 10 may determine that it is connected to charging stand 200, when starting charging battery 25 based on the current supplied from charging stand 200. Common trigger box 100 can determine that a LAN cable (for example, a cross cable) is connected to LAN connector 140, from the output of LAN interface 150. Thus, wearable camera 10 and common trigger box 100 are connected to each other so as to enable wired communication (for example, LAN communication) through charging stand 200 (S30). Since step S30 and the subsequent processes are respectively the same as step S22 and the subsequent processes in FIG. 10, the same step numbers are attached and the description thereof will be omitted.

Since wearable camera 10 does not include an LAN communication interface and a connector, LAN communication with common trigger box 100 is possible through charging stand 200, but since wearable camera 10 includes USB interface 22 and contact terminal 23, it is possible to directly perform USB communication with common trigger box 100. In this case, the charging stand 200 may not be involved.

If RS232 is used as a communication standard for wired communication, the maximum communication speed between wearable camera 10 and common trigger box 100 is 20 kbps and the maximum wiring length is 15 m. If RS423 is used as a communication standard for wired communication, the maximum communication speed between wearable camera 10 and common trigger box 100 is 300 kbps and the maximum wiring length is 600 m. If Ethernet (registered trademark) is used as a communication standard for wired communication, the maximum communication speed between wearable camera 10 and common trigger box 100 is 100 Mbps and the maximum wiring length is 100 m. If USB2.0 is used as a communication standard for wired communication, the maximum communication speed between wearable camera 10 and common trigger box 100 is 480 Mbps and the maximum wiring length is 5 m. If USB3.0 is used as a communication standard for wired communication, the maximum communication speed between wearable camera 10 and common trigger box 100 is 4 Gbps and the maximum wiring length is 3 m.

As described above, in communication system 1000 of the first approach of Exemplary embodiment 2, wearable camera 10 further includes wireless registration switch SW5 for instructing to start the communication setting process (for example, pairing), and starts the communication setting process (for example, pairing) with common trigger box 100, in response to the pressing operation on wireless registration switch SW5. Common trigger box 100 further includes switch 170 for instructing the start of the communication setting process (for example, pairing), and starts the communication setting process (for example, pairing) with wearable camera 10 by narrowing a wireless communication area (communication coverage area) in processor 110 as an example of second communication setter, in response to the pressing operation on switch 170.

Thus, the police officer can accurately perform a communication setting process (for example, pairing) with common trigger box 100 of proper police vehicle 7 (specifically, the police office is supposed to ride on), by simple operations of respectively pressing wireless registration switch SW5 of wearable camera 10 and switch 170 of common trigger box 100. In other words, wearable camera 10 can reliably avoid execution of the communication setting process with the common trigger box of another police vehicle on which the police officer does not ride.

In communication system 1000 of the second approach of Exemplary embodiment 2, in a case of being connected with common trigger box 100 by a wired (for example, a LAN cable) and being connected with charging stand 200 that charges wearable camera 10, wearable camera 10 starts the communication setting process (for example, pairing) with common trigger box 100 by wired communication (LAN communication) through charging stand 200. In a case where wearable camera 10 is connected to charging stand 200, common trigger box 100 starts the communication setting process (for example, pairing) with wearable camera 10 by wired communication (LAN communication) through charging stand 200.

Thus, the police officer can accurately perform a communication setting process (for example, pairing) with common trigger box 100 of proper police vehicle 7 (specifically, the police office is supposed to ride on), by a simple operation of setting wearable camera 10 in charging stand 200. In other words, wearable camera 10 can reliably avoid execution of the communication setting process with the common trigger box of another police vehicle on which the police officer does not ride.

(Process Leading to Exemplary Embodiment 3)

As described in the first approach of Exemplary embodiment 2, it is necessary for the police officer to press switch 170 of common trigger box 100, in order to start the communication setting process (for example, pairing) between wearable camera 10 and common trigger box 100 of the police vehicle 7. As described above, common trigger box 100 is deployed in the trunk room due to restrictions such as the size thereof and installation positions of various devices disposed in police vehicle 7. Therefore, the police officer needed to open the trunk and press switch 170 of common trigger box 100.

Exemplary Embodiment 3

Therefore, in Exemplary embodiment 3, as a modification of Exemplary embodiment 2, examples of common trigger box 100 and communication system 1000 will be described which are capable of detecting that wearable camera 10 is connected to charging stand 200, even if the police officer dose not purposely open the trunk of police vehicle 7 and does not press switch 170 of common trigger box 100.

Figure 12:
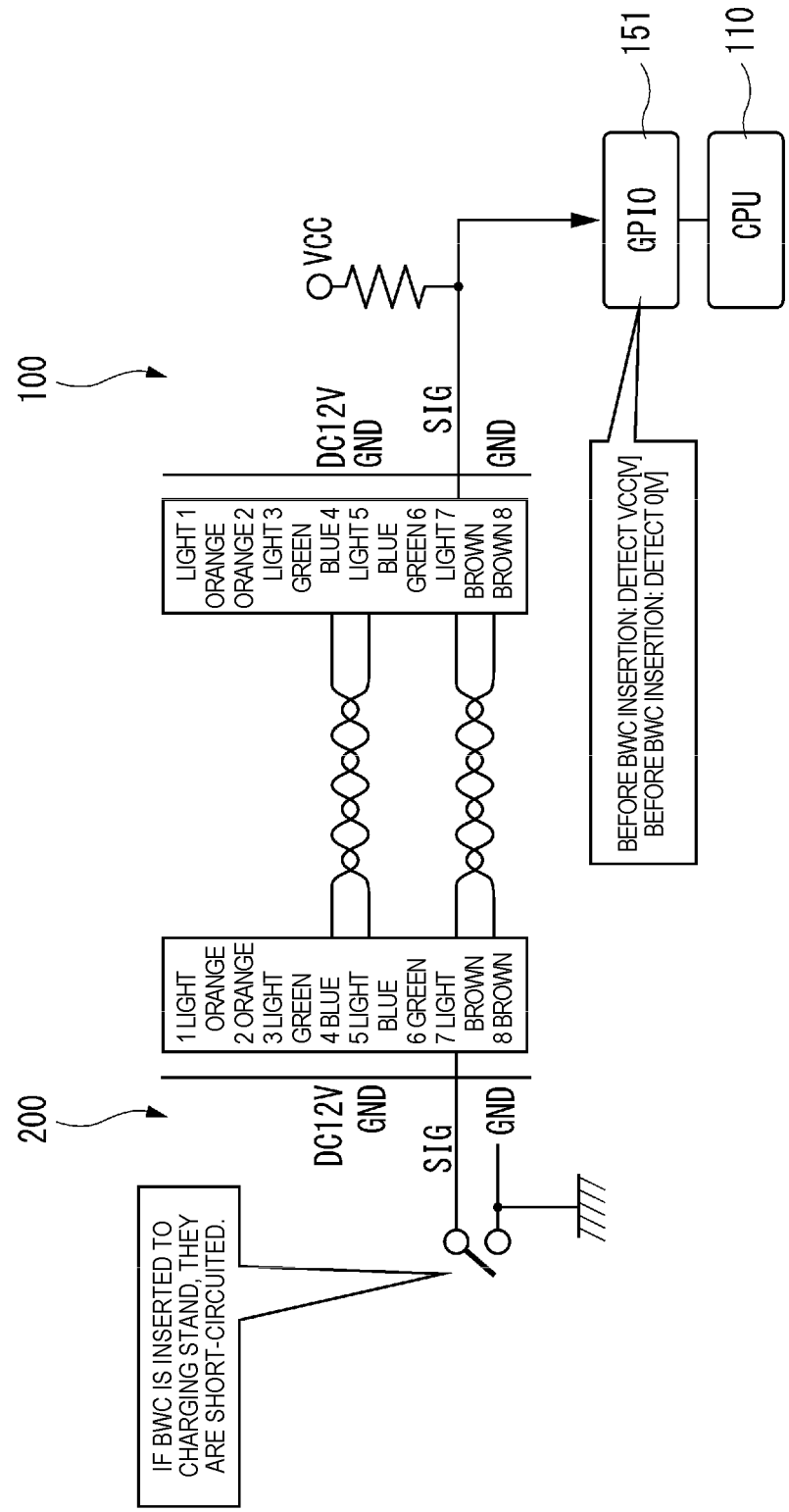
FIG. 12 is an explanatory diagram illustrating an example of an outline of an operation of a common trigger box in Exemplary embodiment 3.

FIG. 12 is an explanatory diagram illustrating an example of an outline of an operation of common trigger box 100 in Exemplary embodiment 3. In FIG. 12, the seventh (light brown) terminal (that is, the signal (SIG) terminal) and the eighth (brown) terminal (that is, ground (GND) terminal) of a LAN cable (center of paper of FIG. 12, for example, a straight cable) are shown as terminals indicating the status of the presence or absence of connection of the LAN cable. The fourth (blue) terminal and the fifth (light blue) terminal are terminals indicating the situation of power supply. The LAN cable connects charging stand 200 on which wearable camera 10 is placed (inserted) and common trigger box 100.

As described above, LAN interface 150 (see FIG. 8) of common trigger box 100 includes GPIO 151 (see FIG. 12, that is, a parallel interface) to which an output of a signal (SIG) terminal of the LAN cable (for example, a crossover cable) is input. For example, if the police officer inserts wearable camera 10 to charging stand 200 (that is, wearable camera 10 is set on charging stand 200), the seventh signal (SIG) terminal of the LAN cable on the charging stand 200 side and the eighth ground (GND) terminal are short-circuited and connected. With this short-circuit, GPIO 151 detects 0 (zero) as the output of the seventh signal (SIG) terminal of the LAN cable on common trigger box 100 side. Before a short-circuit occurs between the seventh signal (SIG) terminal of the LAN cable on the charging stand 200 side and the eighth ground (GND) terminal, GPIO 151 detects the power supply voltage VCC. Accordingly, processor 110 of common trigger box 100 can appropriately determine whether or not wearable camera 10 is connected to charging stand 200, depending on whether the output of GPIO 151 is the power supply voltage VCC or 0 (zero).

Figure 13:
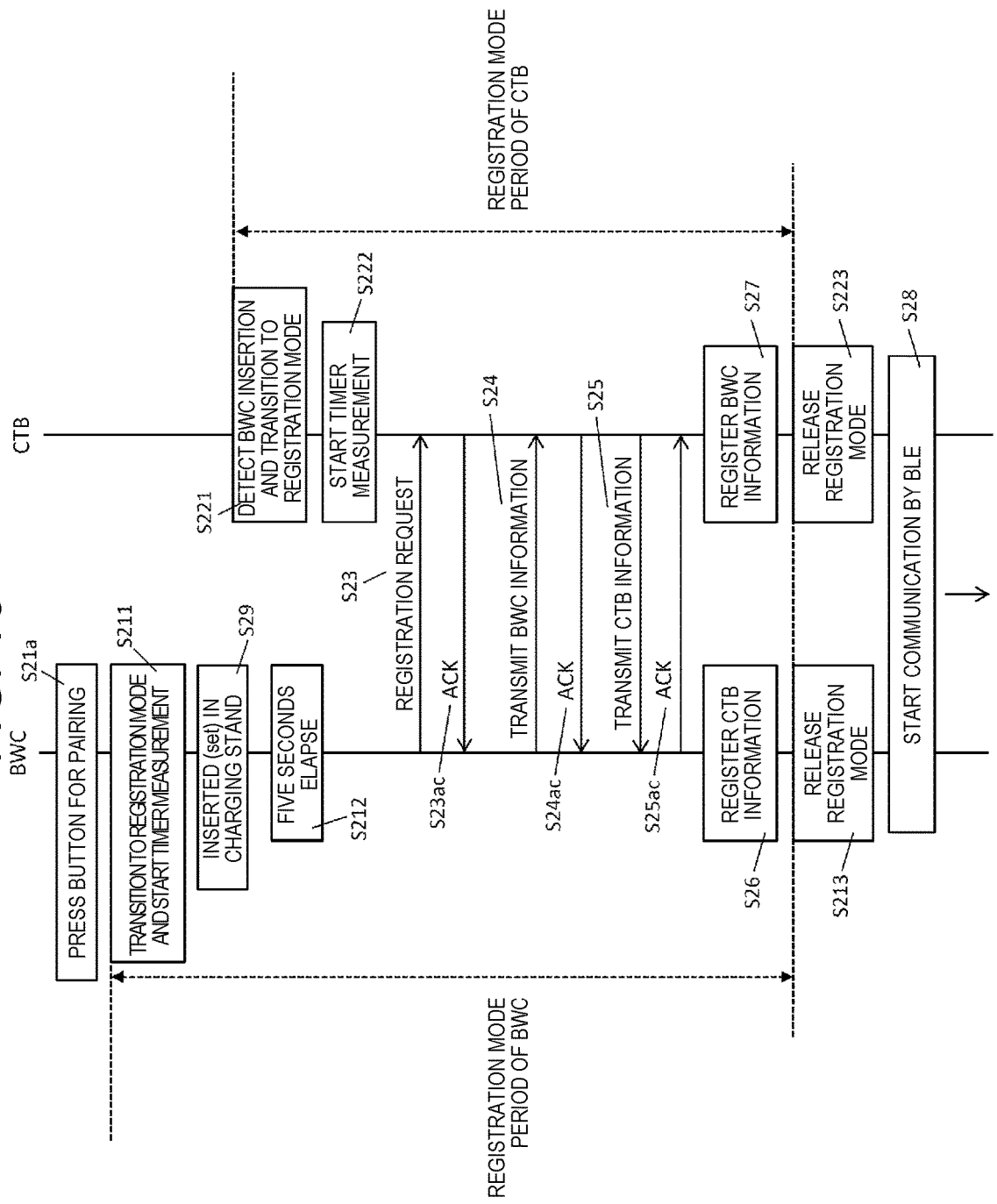
FIG. 13 is a sequence diagram illustrating in detail an example of an operation procedure regarding pairing between a wearable camera and a common trigger box in Exemplary embodiment 3.

Next, the operation procedure of the communication setting process (for example, pairing) between wearable camera 10 and common trigger box 100 in Exemplary embodiment 3 will be described with reference to FIG. 13. FIG. 13 is a sequence diagram illustrating in detail the operation procedure regarding pairing between wearable camera 10 and common trigger box 100 in Exemplary embodiment 3. In the process of FIG. 13, the same step numbers are given to the same processes as the processes of FIG. 10 or FIG. 11B, and the description thereof will be omitted.

In FIG. 13, when the button for pairing of wearable camera 10 (that is, wireless registration switch SW5) is pressed by the police officer (S21a), wearable camera 10 transitions to the registration mode (that is, an operation mode for executing the communication setting process (for example, pairing) with common trigger box 100), and starts the measurement of a timer (not shown) (S211). The timer is used to perform measurement from the start time to the end time of the registration mode period in wearable camera 10.

After step S211, it is assumed that wearable camera 10 is set on charging stand 200 (S29). After a predetermined time (for example, five seconds) has elapsed from the start of measurement of the timer in step S211 (S212), wearable camera 10 assumes that common trigger box 100 detects the setting of wearable camera 10 on charging stand 200, and performs the process of step S23.

On the other hand, if it is detected that wearable camera 10 is set on charging stand 200 based on the output of GPIO 151, common trigger box 100 transitions to the registration mode (that is, the operation mode for executing the communication setting process (for example, pairing) with wearable camera 10) (S221), similar to wearable camera 10. Further, common trigger box 100 starts measurement of a timer (not shown) (S222). The timer is built in for example, processor 110 and is used to measure from the start time to the end time of the registration mode period in common trigger box 100. As shown in FIG. 13, the registration mode period of wearable camera 10 is longer than the registration mode period of common trigger box 100. This is because a certain time is required for common trigger box 100 to detect that wearable camera 10 is set on charging stand 200 and wearable camera 10 is set to be longer considering the certain time (for example, five seconds). After the step S222, common trigger box 100 waits for reception of a registration request transmitted from the wearable camera 10.

In steps S23 to S27, a communication setting process (for example, pairing) between wearable camera 10 and common trigger box 100 is performed. After step S26, wearable camera 10 determines that the measurement of the timer has ended, and releases the registration mode (S213). Similarly, common trigger box 100 determines that the measurement of the timer has ended, and releases the registration mode (S223). Thus, wearable camera 10 and common trigger box 100 can start wireless communication using BLE communication (S28).

As described above, in communication system 1000 of Exemplary embodiment 3, in a case of being connected with common trigger box 100 by a wire (for example, a LAN cable) and being connected with charging stand 200 that charges wearable camera 10, wearable camera 10 starts the communication setting process (for example, pairing) with common trigger box 100 by wired communication (LAN communication) through charging stand 200. Common trigger box 100 detects that wearable camera 10 is connected to charging stand 200, and starts the communication setting process (for example, pairing) with wearable camera 10 by wired communication (LAN communication) through charging stand 200.

This allows the police officer to execute the communication setting process of wireless communication (for example, pairing) through charging stand 200 between wearable camera 10 and common trigger box 100, with a simple operation such as setting wearable camera 10 on charging stand 200, even if the police officer dose not purposely open the trunk of police vehicle 7 and does not press switch 170 of common trigger box 100. That is, the labor of the police officer of the communication setting process (for example, pairing) between wearable camera 10 and common trigger box 100 can be significantly reduced. In addition, since it can be detected that wearable camera 10 is set on charging stand 200, common trigger box 100 can perform the communication setting process, and can charge battery 25 of wearable camera 10 through charging stand 200.

Wearable camera 10 further includes wireless registration switch SW5 for instructing the start of the communication setting process (for example, pairing), and starts the communication setting process (for example, pairing) with common trigger box 100 by wired communication (LAN communication) after lapse of a predetermined time (for example, five seconds) from the execution of the press operation on wireless registration switch SW5.

Thus, since wearable camera 10 can start the communication setting process (for example, pairing) after a lapse of a certain time required for common trigger box 100 to detect that wearable camera 10 has been set on charging stand 200, the communication setting process can be started smoothly without waste with common trigger box 100.

(Process Leading to Exemplary Embodiment 4)

A wearable camera often continues capturing during police officers' work (for example, during patrolling, or when rushing to the field of incident and dealing with various measures at the field of incident). Therefore, the capacity consumption of the battery of the wearable camera is large, and charging the battery of the wearable camera used routinely by the police officer is an urgent and important problem. For charging the wearable camera, for example, the following two methods are conceivable. A first charging method is a method of connecting a cigar charger for charging (not shown) installed in the police vehicle, to the wearable camera. A second charging method is a method of connecting the in-vehicle PC for editing and the wearable camera for adding attribute information to the captured image of the wearable camera, with a USB cable.

According to the first charging method, since a large capacity (for example, 2 ampere (A)) of current is supplied from the cigar charger, high speed charging of the wearable camera is possible. However, with the first charging method, there is a problem that the police officer cannot perform an editing process such as adding attribute information on the data of the captured image of the wearable camera during charging of the wearable camera.

On the other hand, in the second charging method, since the current supplied from the USB 2.0 port of the in-vehicle PC is up to 500 milliamperes (mA), there is a problem that it takes too much time to complete charging compared with charging using the cigar charger.

In the case where a wearable camera is connected to an in-vehicle PC with an intend to pick up a large current, there is a problem that a safety circuit in the in-vehicle PC operates and it is not possible to charge the wearable camera, and as well as not to perform USB communication. Therefore, in the case where the wearable camera is connected to the in-vehicle PC, it is usual to design so as to pick up the current only up to 500 milliamperes (mA).

Exemplary Embodiment 4

Thus, in Exemplary embodiment 4, an example of charging stand 200 and communication system 1000 will be described, indicating a state where the current from the external battery (for example, the above-mentioned cigar charger or an accessory (ACC)) is supplied and wearable camera 10 is being charged, and a state where the USB port of the in-vehicle PC and wearable camera 10 are connected, in-vehicle PC 32 capable of various types of editing processes on the data of the captured image of wearable camera 10 and wearable camera 10 are being connected.

Figure 14:
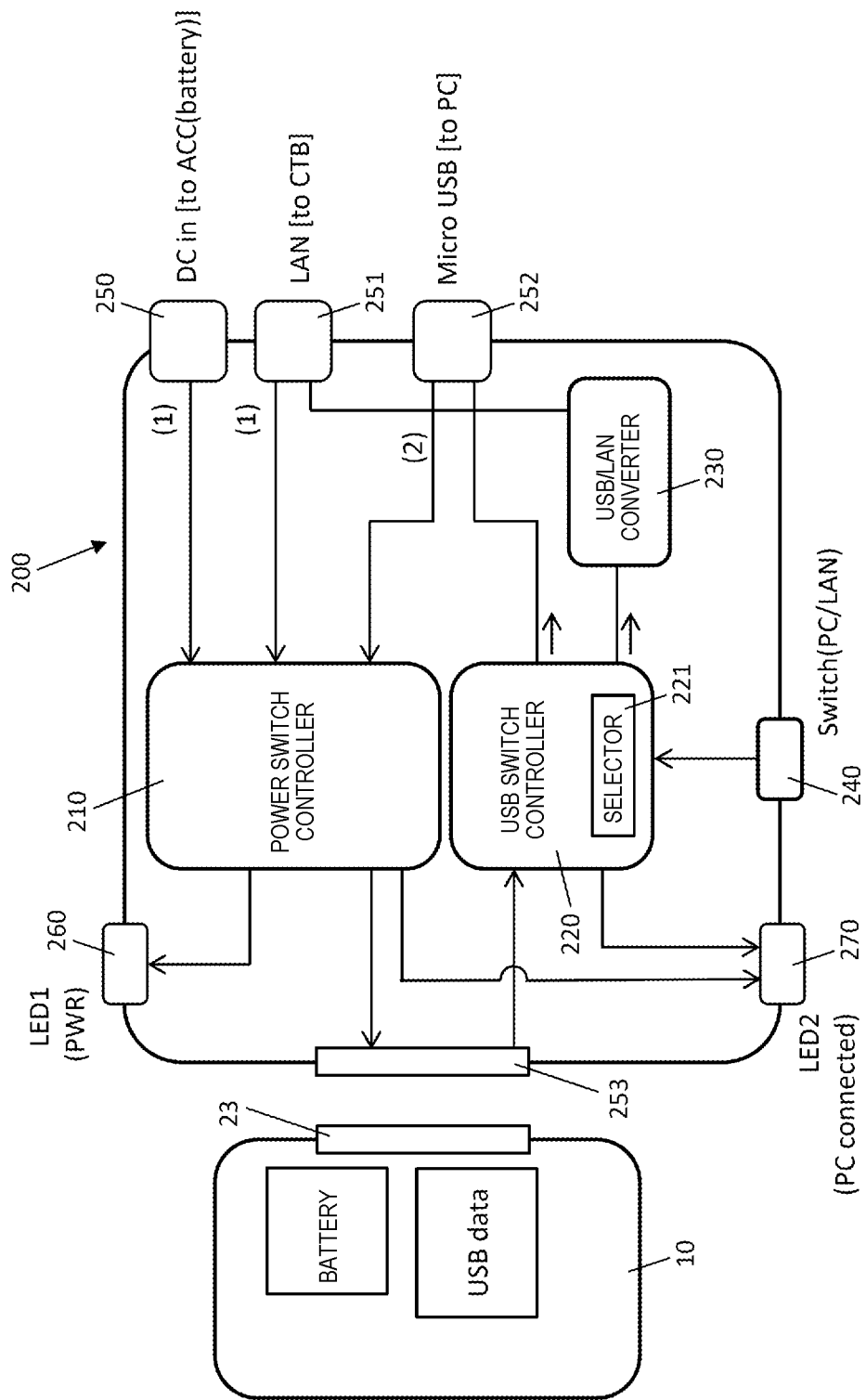
FIG. 14 is a block diagram illustrating in detail an example of the internal configuration of a charging stand in Exemplary embodiment 4.

FIG. 14 is a block diagram illustrating in detail an example of the internal configuration of charging stand 200 in Exemplary embodiment 4. Charging stand 200 shown in FIG. 14 is configured to include power switch controller 210, USB switch controller 220, USB/LAN signal converter 230, switch 240, connectors 250, 251, 252, and 253, and LEDs 260 and 270. LEDs 260 and 270 are disposed on the upper side surface of a casing (not shown) of charging stand 200 so as to be exposed in a vertically upward direction. Therefore, in the case where charging stand 200 is disposed at, for example, the default position (for example, in the vicinity of the center console) of police vehicle 7, the police officer can check instantaneously the states of LEDs 260 and 270 of charging stand 200 by simply seeing the bottom of the center console.

In the case where only the supply current (for example, 2 ampere (A)) from the external battery (for example, a cigar charger or an ACC) connected to the cable (not shown) connected to connector 250 is supplied, accordingly, power switch controller 210 as an example of the power controller is supplied with the current supplied from connector 250 through connector 253, and charges connected wearable camera 10. Wearable camera 10 charges battery 25 based on the supply current from power switch controller 210 (that is, the supply current from the external battery).

In the case where only the supply current (for example, 2 ampere (A)) from common trigger box 100 connected to the LAN cable (for example, a straight cable) connected to connector 251 is supplied to power switch controller 210, accordingly, power switch controller 210 is supplied with the current supplied from connector 251 through connector 253, and charges connected wearable camera 10. Wearable camera 10 charges battery 25 based on the supply current from power switch controller 210 (that is, the supply current from common trigger box 100).

In the case where only the supply current (for example, 500 milliamperes (mA)) from in-vehicle PC 32 connected to the USB cable (for example, USB 2.0 cable) connected to connector 252 is supplied, accordingly, power switch controller 210 is supplied with the current supplied from connector 252 through connector 253, and charges connected wearable camera 10. Wearable camera 10 charges battery 25 based on the supply current from power switch controller 210 (that is, the supply current from in-vehicle PC 32).

Power switch controller 210 charges wearable camera 10 connected through connector 253, with priority over the supply current from the external battery (for example, a cigar charger or an ACC) connected to a cable (not shown) connected to connector 250, or the supply current from common trigger box 100 connected to a LAN cable connected to connector 251. In other words, if the external battery or common trigger box 100 and in-vehicle PC 32 are connected to charging stand 200, charging stand 200 charges wearable camera 10, with priority over the supply current from the external battery or common trigger box 100. Thus, charging stand 200 can charge wearable camera 10 at a high speed. In a case where the connection with the external battery or common trigger box 100 is not detected and only the connection with in-vehicle PC 32 is detected, charging stand 200 charges wearable camera 10, based on the supply current from in-vehicle PC 32.

Upon receiving the supply current from the external battery (for example, a cigar chatter or an ACC) through connector 250, or from common trigger box 100 through connector 251, power switch controller 210 blinks LED 260 in order to notify the police officer that charging is possible by current being supplied from the charging power source (for example, a cigar charger, an ACC, and common trigger box 100) of wearable camera 10 (in other words, it is being charged).

USB switch controller 220 as an example of a data controller has selector 221. USB switch controller 220 detects through connector 253 that wearable camera 10 has been set on charging stand 200. In a case where it is detected that wearable camera 10 is set on the charging stand 200, the USB switch controller 220 outputs various data transmitted from wearable camera 10 (for example, data of captured images during patrolling or the field of incident), to the USB/LAN signal converter 230 or the connector 252, according to the selection by the selector 221, depending on the state of the switch 240 (that is, either LAN communication or USB communication).

In a case of detecting that wearable camera 10 is set on charging stand 200, USB switch controller 220 turns on LED 270 to notify the police officer that data communication with in-vehicle PC 32 is possible.

USB/LAN signal converter 230 converts the format of various data transmitted from in-vehicle PC 32 from the format for USB communication to the format for LAN communication, and outputs it to connector 251.

The switch 240 is for example, a push button switch, which is provided for switching between USB communication (for example, communication with in-vehicle PC 32) and LAN communication (for example, communication with common trigger box 100). Switch 240 indicates either a USB communication use or a LAN communication use by a selection operation by the police officer, and outputs a signal corresponding to any one of the uses to USB switch controller 220.

Connector 250 as an example of the first connection detector detects connection with an external battery (for example, a cigar charger or an ACC). Connector 250 receives the supply current (for example, maximum 2 A) from an external battery (for example, a cigar charger or an ACC) connected to a cable (not shown) connected to connector 250. The supply current is input to power switch controller 210.

Connector 251 as an example of the first connection detector detects connection with common trigger box 100. Connector 251 receives the supply current (for example, maximum 2 A) from common trigger box 100 connected to the LAN cable (for example, a cross cable) connected to connector 251. The supply current is input to power switch controller 210.

Connector 252 as an example of the second connection detector detects connection with in-vehicle PC 32 capable of editing the data of wearable camera 10. Connector 252 receives the supply current (for example, maximum 500 mA) from in-vehicle PC 32 connected to the USB cable (for example, USB 2.0 cable) connected to connector 252. The supply current is input to power switch controller 210.

Connector 253 detects that wearable camera 10 has been set on charging stand 200. The detection signal is input to USB switch controller 220.

LED 260 as an example of the first notifier is turned in response to a control signal from power switch controller 210 in order to notify the police officer that high-speed charging is possible by current supply from a charging power supply (for example, a cigar charger, an ACC, or common trigger box 100) of wearable camera 10 (in a case where wearable camera 10 is inserted, it is being charged at a high speed).

LED 270 as an example of the second notifier is turned in response to a control signal from USB switch controller 220 in order to notify the police officer that data communication between wearable camera 10 and in-vehicle PC32 is possible because wearable camera 10 is set on charging stand 200. The lighting condition of LED 270 is that switch 240 selects a PC. Detection of the USB signal (that is, a signal to use USB communication, transmitted from a USB port of in-vehicle PC 32) from in-vehicle PC 32 through connector 252 by USB switch controller 220 is added to the lighting condition of LED 270. The lighting condition of LED 270 may be such that charging stand 200 detects the supply of the power (in other words, supply current) from in-vehicle PC 32 to power switch controller 210 through connector 252, instead of detecting the USB signal (see above) from in-vehicle PC 32. It is possible to obtain the same effect even by combining any one or a plurality of conditions among the lighting conditions of LEDs 270 described above.

Figure 15:
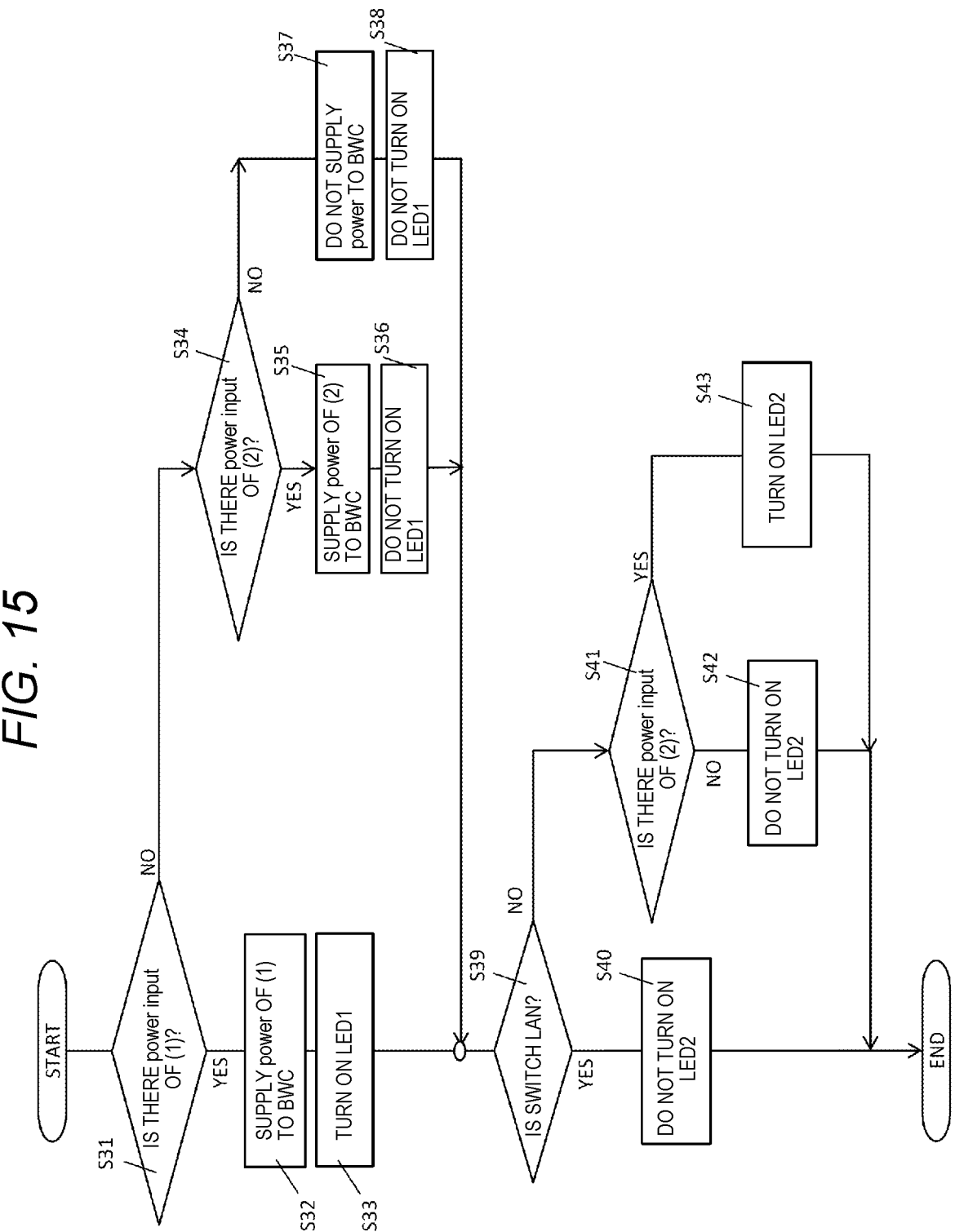
FIG. 15 is a flowchart illustrating in detail an example of an operation procedure of the charging stand in Exemplary embodiment 4.

Next, the operation procedure of charging stand 200 in Exemplary embodiment 4 will be described with reference to FIG. 15 and FIG. 16. FIG. 15 is a flowchart illustrating in detail an example of an operation procedure of charging stand 200 in Exemplary embodiment 4. FIG. 16 is a table illustrating an example of an operation procedure of charging stand 200 illustrated in FIG. 15.

In FIG. 15, charging stand 200 determines whether or not there is "Power input of (1)" shown in FIG. 14 or FIG. 16

(that is, current supply from an external battery or common trigger box 100) (S31). In a case where it is determined that there is "Power input of (1)" (YES in S31), charging stand 200 charges wearable camera 10 (S32), with priority over "Power input of (1)" (that is, current supply from the external battery or common trigger box 100), regardless of the presence or absence of "Power input of (2)", and turns on LED 260 corresponding to LED 1 (S33). In a case where it is determined that there is no "Power input of (1)" (NO in S31), the process of charging stand 200 proceeds to step S34.

That is, charging stand 200 determines whether or not there is "Power input of (2)" (that is, current supply from the USB port of in-vehicle PC 32) (S34). In a case where it is determined that there is "Power input of (2)" (that is, current supply from the USB port of in-vehicle PC 32) (YES in S34), charging stand 200 supplies of "Power input of (2)" to wearable camera 10 (S35). However, since the current value supplied from in-vehicle PC 32 is insufficient for the high-speed charging of wearable camera 10, charging stand 200 does not turn on LED 260 corresponding to LED 1 (S 36). On the other hand, in a case where it is determined that there is no "Power input of (2)" (NO in S34), charging stand 200 does not supply current to wearable camera 10 (S37), and also does not turn on LED 260 corresponding to LED 1 (S38).

With respect to lighting determination of LED 270 corresponding to LED 2, charging stand 200 determines whether or not the switch 240 of FIG. 14 is set to LAN (S39). In a case where switch 240 is set to LAN (YES in S39), charging stand 200, since wearable camera 10 is not connected to common trigger box 100 and is not connected to in-vehicle PC32, charging stand 200 does not turn on LED 270 corresponding to LED 2 (S40).

In a case where switch 240 of FIG. 14 is not set to LAN (that is, it is set to a PC) (NO in S39), charging stand 200 determines whether or not there is "Power input of (2)" (S41). In a case where it is determined that there is no "Power input of (2)" (NO in S41), charging stand 200 does not turn on LED 270 corresponding to LED 2 (S42). On the other hand, in a case where it is determined that there is "Power input of (2)" (YES in S41), charging stand 200 turns on LED 270 corresponding to LED 2 (S43). Note that the process of step S41 may be omitted.

As described above, in communication system 1000 of Exemplary embodiment 4, in a case where the connection with the external battery (for example, a cigar charger or an ACC) or common trigger box 100 is detected, charging stand 200 charges wearable camera 10, based on the supply current (first supply current) from the external battery or common trigger box 100, and notifies the police officer that wearable camera 10 is being charged based on the supply current by turning on LED 260. In a case where the connection with in-vehicle PC32 is detected, charging stand 200 notifies the police officer that wearable camera 10 and in-vehicle PC32 are connected so that data communication is possible (in other words, the data of wearable camera 10 is editable in in-vehicle PC32) by turning on LED 270.

Thus, charging stand 200 can have the police officer accurately determine whether or not wearable camera 10 can be charged, by turning on LED 260, only when the external battery or a large capacity of power (current) of common trigger box 100 is supplied to charging stand 200. Since LED 270 is turned on only when connection with in-vehicle PC 32 is detected, charging stand 200 clearly indicates to the police officer that wearable camera 10 and in-vehicle PC 32 can communicate with each other.

Further, even in a case where any one of connections with an external battery (for example, a cigar charger or an ACC) or common trigger box 100 and connection with in-vehicle PC32 is detected, charging stand 200 charges wearable camera 10, with priority over the supply current from the external battery or common trigger box 100. Thus, since charging stand 200 can charge wearable camera 10 based on the charging current from the external battery or common trigger box 100 which can receive the supply of a large capacity of current for charging, high-speed charging is possible.

While various embodiments have been described with reference to the drawings, it is to be understood that the present disclosure is not limited to such an example. It is apparent to those skilled in the art that changes and modifications are conceivable within the scope described in the claims, and it would be appreciated that those naturally belong to the technical scope of the present disclosure. Further, within the scope not deviating from the gist of the disclosure, respective constituent elements in the above embodiments may arbitrarily be combined.

What is claimed is:

1. A communication system in which a wearable camera capable of being worn or possessed by a user and an in-vehicle communication device mounted in a vehicle can communicate with each other, wherein the wearable camera includes:
   a communication setting button;
   a first processor coupled to the communication setting button; and
   a first memory storing first pairing information used for communication with the in-vehicle communication device, and one or more programs which, when executed by the first processor, cause the wearable camera to:
   detect an operation of the communication setting button,
   in response to detecting the operation of the communication setting button, start a first timer and start operating in a registration mode in which the wearable camera can perform pairing with the in-vehicle communication device,
   detect that the wearable camera is being charged by a charging device that is coupled to the in-vehicle communication device while the wearable camera is operating in the registration mode in which the wearable camera can perform pairing with the in-vehicle communication device,
   in response to detecting the operation of the communication setting button and detecting that the wearable camera is being charged by the charging device coupled to the in-vehicle communication device while the wearable camera is operating in the registration mode in which the wearable camera can perform pairing with the in-vehicle communication device, start performing a first communication setting process in which the first pairing information is transmitted to the in-vehicle communication device through the charging device in a wired communication manner, and
   in response to detecting that a first amount of time has elapsed from starting the first timer, stop operating in the registration mode in which the wearable camera can perform pairing with the in-vehicle communication device and stop performing the first communication setting process, and wherein the in-vehicle communication device includes:
a second processor; and
a second memory storing second pairing information used for communication with the wearable camera, and one or more programs which, when executed by the second processor, cause the in-vehicle communication device to:
detect that the wearable camera is set on the charging stand that is coupled to the in-vehicle communication device, and
upon detection of the wearable camera being set on the charging stand that is coupled to the in-vehicle communication device,
start a second timer,
start operating in a registration mode in which the in-vehicle communication device can perform pairing with the wearable camera,
start performing a second communication process in which the in-vehicle communication device waits to receive a registration request from the wearable camera in the wired communication manner,
in response to receiving the registration request from the wearable camera in the wired manner while the in-vehicle communication device is operating in the registration mode in which the in-vehicle communication device can perform pairing with the wearable camera, transmit the second pairing information to the wearable camera after the first pairing information is received from the wearable camera in the wired communication manner, and
in response to detecting that a second amount of time has elapsed from starting the second timer, the first amount of time being greater than the second amount of time, stop operating in the registration mode in which the in-vehicle communication device can perform pairing with the wearable camera, and stop performing the second communication process.

2. The communication system of claim 1,
wherein the wearable camera receives the second pairing information transmitted by the in-vehicle communication device and registers the second pairing information, and
wherein the in-vehicle communication device registers the first pairing information received from the wearable camera.

3. The communication system of claim 2, wherein the wearable camera performs wireless communication with the in-vehicle communication device using the first pairing information and the second pairing information.

4. The communication system of claim 1, wherein the charging device and the in-vehicle communication device are connected by a LAN cable.

5. The communication system of claim 1, wherein the wearable camera determines from output of the charging device whether the wearable camera is set on the charging device.

6. The communication system of claim 1, wherein the wearable camera includes an indicator that instructs to start a first communication setting process for communicating with the in-vehicle communication device, and starts the first communication setting process with the in-vehicle communication device in a wired communication manner after a lapse of a predetermined time from execution of an operation of the indicator.

7. A communication method performed between a wearable camera capable of being worn or possessed by a user and an in-vehicle communication device mounted in a vehicle, the communication method comprising:
detecting, by the wearable camera, an operation of a communication setting button;
in response to detecting the operation of the communication setting button, starting a first timer and starting operating in a registration mode in which the wearable camera can perform pairing with the in-vehicle communication device,
detecting, by the wearable camera, that the wearable camera is being charged by a charging device that is coupled to the in-vehicle communication device while the wearable camera is operating in the registration mode in which the wearable camera can perform pairing with the in-vehicle communication device,
in response to the detecting the operation of the communication setting button and the detecting that the wearable camera is being charged by the charging device coupled to the in-vehicle communication device while the wearable camera is operating in the registration mode in which the wearable camera can perform pairing with the in-vehicle communication device, transmitting first pairing information from the wearable camera to the in-vehicle communication device through the charging device in a wired communication manner; and
in response to detecting that a first amount of time has elapsed from starting the first timer, stopping operating in the registration mode in which the wearable camera can perform pairing with the in-vehicle communication device and stopping performing the first communication setting process
detecting, by the in-vehicle communication device, that the wearable camera is set on the charging stand that is coupled to the in-vehicle communication device;
in response to the detecting that the wearable camera is set on the charging stand that is coupled to the in-vehicle communication device, starting, by the in-vehicle communication device, a second timer, and starting, by the in-vehicle communication device, operating in a registration mode in which the in-vehicle communication device can perform pairing with the wearable camera,
receiving, by the in-vehicle communication device, the first pairing information transmitted by the wearable camera while the in-vehicle communication device is operating in the registration mode in which the in-vehicle communication device can perform pairing with the wearable camera;
in response to the detecting that the wearable camera is set on the charging stand that is coupled to the in-vehicle communication device and the receiving the first pairing information from the wearable camera while the in-vehicle communication device is operating in the registration mode in which the in-vehicle communication device can perform pairing with the wearable camera, transmitting second pairing information from the in-vehicle communication device to the wearable camera in a wired communication manner; and
in response to detecting that a second amount of time has elapsed from starting the second timer, the first amount of time being greater than the second amount of time, stopping, by the in-vehicle communication device, operating in the registration mode in which the in-vehicle communication device can perform pairing with the wearable camera, and stopping, by the in-vehicle communication device, performing the second communication process.

8. An in-vehicle communication device which is mounted in a vehicle on which a user rides, and can communicate with a wearable camera capable of being worn or possessed by the user, comprising:

a processor; and a memory that stores in-vehicle communication device pairing information used for communication with the wearable camera, and one or more programs which, when executed by the processor, cause the in-vehicle communication device to:

detect that the wearable camera is set on a charging stand that is coupled to the in-vehicle communication device, receive wearable camera pairing information from the wearable camera, and upon detection of the wearable camera being set on the charging stand that is coupled to the in-vehicle communication device, start a timer, start operating in a registration mode in which the in-vehicle communication device can perform pairing with the wearable camera, start performing a communication setting process in which the in-vehicle communication device waits to receive a registration request from the wearable camera in a wired communication manner, in response to receiving the registration request from the wearable camera in the wired manner while the in-vehicle communication device is operating in the registration mode in which the in-vehicle communication device can perform pairing with the wearable camera, transmit the in-vehicle communication device pairing information to the wearable camera after the wearable camera pairing information is received from the wearable camera, and in response to detecting that a predetermined amount of time has elapsed from starting the timer, stop operating in the registration mode in which the in-vehicle communication device can perform pairing with the wearable camera, and stop performing the communication process.

* * * * *